US012055889B2

(12) United States Patent
Nishikawa et al.

(10) Patent No.: US 12,055,889 B2
(45) Date of Patent: Aug. 6, 2024

(54) TONER

(71) Applicant: CANON KABUSHIKI KAISHA, Tokyo (JP)

(72) Inventors: Koji Nishikawa, Shizuoka (JP); Yasuhiro Hashimoto, Shizuoka (JP); Yuujirou Nagashima, Shizuoka (JP); Tomoya Nagaoka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 17/196,555

(22) Filed: Mar. 9, 2021

(65) Prior Publication Data

US 2021/0286281 A1 Sep. 16, 2021

(30) Foreign Application Priority Data

Mar. 16, 2020 (JP) ................................ 2020-045834

(51) Int. Cl.
*G03G 9/087* (2006.01)

(52) U.S. Cl.
CPC ..... *G03G 9/08773* (2013.01); *G03G 9/08724* (2013.01); *G03G 9/08782* (2013.01)

(58) Field of Classification Search
None
See application file for complete search history.

(56) References Cited

U.S. PATENT DOCUMENTS

| | | | |
|---|---|---|---|
| 5,547,804 A * | 8/1996 | Nishizawa ........... | C09D 11/106 430/114 |
| 5,601,913 A | 2/1997 | Ohtani et al. | |
| 7,112,393 B2 | 9/2006 | Komoto et al. | |
| 7,273,686 B2 | 9/2007 | Onuma et al. | |
| 7,288,354 B2 | 10/2007 | Moribe et al. | |
| 7,306,889 B2 | 12/2007 | Okubo et al. | |
| 7,351,509 B2 | 4/2008 | Moribe et al. | |
| 7,422,832 B2 | 9/2008 | Ogawa et al. | |
| 7,459,253 B2 | 12/2008 | Abe et al. | |
| 7,582,401 B2 | 9/2009 | Ogawa et al. | |
| 7,745,089 B2 | 6/2010 | Okubo et al. | |
| 8,053,156 B2 | 11/2011 | Abe et al. | |
| 8,247,147 B2 | 8/2012 | Abe et al. | |
| 8,367,289 B2 | 2/2013 | Isono et al. | |
| 8,440,382 B2 | 5/2013 | Isono et al. | |
| 8,497,054 B2 | 7/2013 | Sugiyama et al. | |
| 8,652,737 B2 | 2/2014 | Handa et al. | |
| 8,778,581 B2 | 7/2014 | Nonaka et al. | |
| 8,916,319 B2 | 12/2014 | Ikeda et al. | |
| 8,940,467 B2 | 1/2015 | Hashimoto et al. | |
| 9,201,323 B2 | 12/2015 | Nishikawa et al. | |
| 9,229,345 B2 | 1/2016 | Ikeda et al. | |
| 9,261,804 B2 | 2/2016 | Yamazaki et al. | |
| 9,341,970 B2 | 5/2016 | Yoshiba et al. | |
| 9,423,714 B2 | 8/2016 | Kenmoku et al. | |
| 9,470,993 B2 | 10/2016 | Nishikawa et al. | |
| 9,588,450 B2 | 3/2017 | Tsuda et al. | |
| 9,606,462 B2 | 3/2017 | Nomura et al. | |
| 9,715,188 B2 | 7/2017 | Terauchi et al. | |
| 9,772,570 B2 | 9/2017 | Tsuda et al. | |
| 9,804,514 B2 | 10/2017 | Suzumura et al. | |
| 9,829,818 B2 | 11/2017 | Yoshiba et al. | |
| 9,841,692 B2 | 12/2017 | Hasegawa et al. | |
| 9,964,874 B2 | 5/2018 | Suzumura et al. | |
| 9,971,263 B2 | 5/2018 | Fukudome et al. | |
| 10,012,919 B2 | 7/2018 | Matsui et al. | |
| 10,101,683 B2 | 10/2018 | Nishikawa et al. | |
| 10,156,800 B2 | 12/2018 | Tsuda et al. | |
| 10,197,934 B2 | 2/2019 | Matsui et al. | |
| 10,228,627 B2 | 3/2019 | Nagashima et al. | |
| 10,289,016 B2 | 5/2019 | Fukudome et al. | |
| 10,295,920 B2 | 5/2019 | Nishikawa et al. | |
| 10,295,921 B2 | 5/2019 | Ohmori et al. | |
| 10,303,075 B2 | 5/2019 | Tanaka et al. | |
| 10,310,397 B2 | 6/2019 | Sano et al. | |

(Continued)

FOREIGN PATENT DOCUMENTS

| | | |
|---|---|---|
| JP | 2006-235027 A | 9/2006 |
| JP | 2006-243717 A | 9/2006 |

(Continued)

OTHER PUBLICATIONS

JP-2013140235-A Translation (Year: 2023).*
JP-2018136374-A Translation (Year: 2023).*
U.S. Appl. No. 17/193,079, filed Mar. 5, 2021, Tomoya Nagaoka.
U.S. Appl. No. 17/195,716, filed Mar. 9, 2021, Yasuhiro Hashimoto.
U.S. Appl. No. 17/197,102, filed Mar. 10, 2021, Yuujirou Nagashima.
Yuji Harazaki, "Basic Coating Science" pp. 54-57, Sep. 15, 1977, Maki Shoten Publishing.

*Primary Examiner* — Peter L Vajda
*Assistant Examiner* — Charles Collins Sullivan, IV
(74) *Attorney, Agent, or Firm* — VENABLE LLP

(57) ABSTRACT

A toner comprising: a toner particle that comprises a core particle comprising a binder resin, and a shell layer comprising a thermoplastic resin on a surface of the core particle; and organosilicon polymer particles on a surface of the toner particle, wherein a peak top molecular weight of the thermoplastic resin, according to measurement by gel permeation chromatography, is 30000 to 500000, a number-average primary particle diameter of the organosilicon polymer particles is 10 nm to 500 nm, and an absolute value of a difference (ΔSP) between an SP value ($SP_{Si}$) of the organosilicon polymer particles and an SP value ($SP_{Sh}$) of the thermoplastic resin present in the shell layer is not more than 2.30.

8 Claims, No Drawings

(56) References Cited

U.S. PATENT DOCUMENTS

| | | | | |
|---|---|---|---|---|
| 10,698,327 | B2 | 6/2020 | Nagashima et al. | |
| 10,732,529 | B2 | 8/2020 | Yoshiba et al. | |
| 10,845,722 | B2 | 11/2020 | Nishikawa et al. | |
| 10,852,650 | B2 | 12/2020 | Inoue et al. | |
| 10,942,463 | B2 | 3/2021 | Yoshiba et al. | |
| 10,983,450 | B2 | 4/2021 | Nomura et al. | |
| 10,983,451 | B2 | 4/2021 | Hashimoto et al. | |
| 2005/0026062 | A1* | 2/2005 | Komoto | G03G 9/09716 430/108.5 |
| 2010/0167197 | A1 | 7/2010 | Yuasa | |
| 2015/0056549 | A1* | 2/2015 | Ikeda | G03G 9/08711 430/108.22 |
| 2015/0125790 | A1 | 5/2015 | Hotta et al. | |
| 2015/0220013 | A1 | 8/2015 | Nishikawa et al. | |
| 2016/0139522 | A1 | 5/2016 | Yoshiba et al. | |
| 2016/0161874 | A1 | 6/2016 | Yamazaki et al. | |
| 2016/0187797 | A1* | 6/2016 | Kosaki | G03G 9/09371 430/110.2 |
| 2016/0378003 | A1* | 12/2016 | Arimura | G03G 9/0836 430/110.1 |
| 2017/0123333 | A1 | 5/2017 | Kuroki et al. | |
| 2017/0227861 | A1* | 8/2017 | Zenitani | G03G 9/0819 |
| 2018/0246432 | A1* | 8/2018 | Nishikawa | G03G 9/09307 |
| 2018/0329328 | A1 | 11/2018 | Tanaka | |
| 2019/0271928 | A1* | 9/2019 | Hotta | G03G 9/0819 |
| 2020/0026208 | A1* | 1/2020 | Terui | G03G 9/08755 |
| 2020/0026209 | A1 | 1/2020 | Yagi | |
| 2020/0166861 | A1 | 5/2020 | Uratani et al. | |
| 2020/0183293 | A1 | 6/2020 | Kinumatsu et al. | |
| 2020/0183294 | A1 | 6/2020 | Fukudome et al. | |
| 2020/0209768 | A1 | 7/2020 | Furui et al. | |
| 2020/0209770 | A1 | 7/2020 | Nishikawa et al. | |
| 2020/0363746 | A1 | 11/2020 | Komiya et al. | |
| 2020/0379363 | A1 | 12/2020 | Nagaoka et al. | |

FOREIGN PATENT DOCUMENTS

| | | | | |
|---|---|---|---|---|
| JP | 2010-91704 | A | | 4/2010 |
| JP | 2013140235 | A | * | 7/2013 |
| JP | 2016-126140 | A | | 7/2016 |
| JP | 2017-219823 | A | | 12/2017 |
| JP | 2018-4804 | A | | 1/2018 |
| JP | 2018-4949 | A | | 1/2018 |
| JP | 2018-72389 | A | | 5/2018 |
| JP | 2018136374 | A | * | 8/2018 |
| JP | 2019-56897 | A | | 4/2019 |
| JP | 2020-12942 | A | | 1/2020 |
| WO | 2007/034625 | A1 | | 3/2007 |

* cited by examiner

TONER

BACKGROUND OF THE INVENTION

Field of the Invention

The present disclosure relates to a toner used in image-forming methods such as an electrophotographic method.

Description of the Related Art

Longer life and greater energy savings are required of electrophotographic image-forming apparatuses, and in response to the requirements, further improvements in various properties are required also of a toner. With regard to the toner, in particular, greater quality stability, i.e., an improved long-term durability, is required within the context of extending the service life. In addition, a better low-temperature fixability is required within the context of achieving greater energy savings.

Conventionally, designs that lower the viscosity of a toner base particle have been formulated in order to improve the low-temperature fixability. However, since simply lowering the viscosity of the toner base particle by itself results in the occurrence of various problems, e.g., with the storability and durability, the storability has been improved by disposing a resin shell layer on the toner base particle surface and the durability has been maintained by using a spacer particle provided as an external additive. However, when the resin shell layer is disposed on the toner base particle surface and also the spacer particle is used, it has been difficult to obtain a satisfactory low-temperature fixability, because toner melting ends up being impaired. While there have also been efforts to improve the durability through the use of, as the spacer particle, particles of an elastic material. e.g., resin fine particles or silicone fine particles, it has still not been easy to bring about, at a high degree, both low-temperature fixability and durability while maintaining storability.

Japanese Patent Application Laid-open No. 2017-219823 proposes that contamination of a photosensitive drum can be ameliorated through the external addition of lubricating particles to the toner particle. Japanese Patent Application Laid-open No. 2018-004804 proposes that the transferability can be improved through control of attachment forces by coating the toner particle surface with resin particles. Japanese Patent Application Laid-open No. 2018-004949 proposes that toner lubricity can be improved through the external addition of silicone particle-type particles to the toner particle. Japanese Patent Application Laid-open No. 2016-126140 proposes that toner durability can be improved by the external addition of silicone resin particles, which have the reverse polarity from the toner particle, to the toner particle. With these technologies, certain effects with regard to photosensitive drum contamination, transferability, and durability are ascertained.

SUMMARY OF THE INVENTION

However, there is room for further study with regard to achieving both long-term durability and low-temperature fixability while maintaining storability. The present disclosure provides a toner that solves this problem. Specifically, the present disclosure provides a toner that can achieve both long-term durability and low-temperature fixability while maintaining storability.

The present inventors have found that the aforementioned problem can be solved by the use, in the shell layer, of a thermoplastic resin having a controlled peak top molecular weight and by controlling the difference between the SP value of the shell layer and the SP value of organosilicon polymer particles, which are used as spacer particles.

The present disclosure relates to a toner comprising:
- a toner particle that comprises
  - a core particle comprising a binder resin, and
  - a shell layer comprising a thermoplastic resin on a surface of the core particle; and
- organosilicon polymer particles on a surface of the toner particle, wherein
- a peak top molecular weight of the thermoplastic resin, according to measurement by gel permeation chromatography, is 30000 to 500000,
- a number-average primary particle diameter of the organosilicon polymer particles is 10 nm to 500 nm, and
- an absolute value of a difference (ΔSP) between an SP value ($SP_{Si}$) of the organosilicon polymer particles and an SP value ($SP_{Sh}$) of the thermoplastic resin present in the shell layer is not more than 2.30.

The present disclosure can thus provide a toner that can achieve both long-term durability and low-temperature fixability while maintaining storability. Further features of the present invention will become apparent from the following description of exemplary embodiments.

DESCRIPTION OF THE EMBODIMENTS

Unless specifically indicated otherwise, the expressions "from XX to YY" and "XX to YY" that show numerical value ranges refer to numerical value ranges that include the lower limit and upper limit that are the end points. When numerical value ranges are provided in stages, the upper limits and lower limits of the individual numerical value ranges may be combined in any combination.

As indicated above, it has not been easy bringing about at a high degree both low-temperature fixability and durability while maintaining storability just through the disposition of a resin shell layer on the toner base particle surface and the use of spacer particles as an external additive. The present inventors thought that the architecture in the vicinity of the toner surface, which is one factor in impairing toner melting, is crucial for bringing about coexistence between the long-term durability and low-temperature fixability while maintaining the storability.

The present inventors carried out repeated investigations from this viewpoint, and as a result of detailed observations of post-fixing images found that when the toner-to-toner connection between neighboring melted toner in the image is inadequate, the melted toner then readily detaches when the image is rubbed and the low-temperature fixability is reduced. It was thus thought that strengthening the toner-to-toner connection between melted toner would be effective for improving the low-temperature fixability. The following architecture was considered in order establish toner-to-toner connectedness for the melted toner, for a configuration in which a resin shell layer has been disposed on the toner core particle surface in order to achieve storability and long-term durability.

A thermoplastic resin having a controlled peak top molecular weight is used for the shell layer and the absolute value of the difference between the SP value of the shell layer and the SP value of organosilicon polymer particles used as spacer particles is controlled. It was discovered that, as a result, not only could the storability and durability be improved, but the low-temperature fixability could also be improved through a strengthening of toner-to-toner connectedness for the toner melted during fixing.

The effects therefrom are thought to be as follows. The shell layer on the toner begins to melt during fixing. When the absolute value of the difference between the SP value of the shell layer and the SP value of the organosilicon polymer particles is small, the melted shell layer is readily drawn or wicked to the organosilicon polymer particles by capillary action. It is thought that, through the occurrence of this phenomenon on a toner-to-toner basis, connection can be established between the organosilicon polymer particles on a particular toner and the melted shell layer on a neighboring toner.

Specifically, the toner is a toner comprising:
- a toner particle that comprises
  - a core particle comprising a binder resin, and
  - a shell layer comprising a thermoplastic resin on a surface of the core particle; and
- organosilicon polymer particles on a surface of the toner particle, wherein
- a peak top molecular weight of the thermoplastic resin, according to measurement by gel permeation chromatography, is 30000 to 500000,
- a number-average primary particle diameter of the organosilicon polymer particles is 10 nm to 500 nm, and
- an absolute value of a difference (ΔSP) between an SP value ($SP_{Si}$) of the organosilicon polymer particles and an SP value ($SP_{Sh}$) of the thermoplastic resin present in the shell layer is not more than 2.30.

The toner contains organosilicon polymer particles as an external additive. Organosilicon polymer particles exhibit elasticity. Even when the toner is continuously subjected to loading from, e.g., the developing device, due to long-term use, the organosilicon polymer particles absorb the load through elastic deformation. When released from loading, the organosilicon polymer particles return to their original shape. Due to these effects the organosilicon polymer particles resist becoming buried in the toner particle. As a result, the organosilicon polymer particles are effective as spacer particles for improving the long-term durability.

When the spacer particles are inorganic fine particles, continuous loading during long-term use results in the inorganic fine particles gradually becoming buried in the toner particle, and it may then not be possible to maintain long-term durability. This is thought to occur because the inorganic fine particles cannot undergo elastic deformation and thus cannot absorb the load. When the spacer particles are resin fine particles, the resin fine particles can absorb the load because they exhibit elasticity. However, when resin fine particles are subjected to continuous loading during long-term use, the resin fine particles themselves can gradually undergo plastic deformation and ultimately break and maintenance of long-term durability may not be possible. In addition, resin fine particles can have an unsatisfactory charging performance and fogging may then be produced.

The peak top molecular weight of the thermoplastic resin, according to measurement by gel permeation chromatography, is 30000 to 500000 and is preferably 100000 to 400000. When the peak top temperature is in the indicated range, the shell layer rapidly melts during fixing, connection of the organosilicon polymer particles is facilitated, and the low-temperature fixability is readily enhanced. When the peak top molecular weight is less than 30000, the long-term durability then readily undergoes a decline. When, on the other hand, 500000 is exceeded, the shell melting rate during fixing is reduced and obtaining the effect on the low-temperature fixability is impaired. The peak top molecular weight of the thermoplastic resin can be controlled by changing the composition of and production conditions for the thermoplastic resin.

The number-average primary particle diameter of the organosilicon polymer particles is 10 nm to 500 nm, preferably 10 nm to 200 nm, and more preferably 10 nm to 130 nm. When the number-average primary particle diameter is in the indicated range, connection during fixing between the shell layer and the organosilicon polymer particles on neighboring melted toner is facilitated and the low-temperature fixability is readily enhanced.

Obtaining the effects as a spacer particle is impaired when the number-average primary particle diameter is less than 10 nm and the durability then readily declines. When the number-average primary particle diameter is larger than 500 nm, the organosilicon polymer particles easily become detached from the toner particle during long-term use, and as a result the development of functionality as a spacer particle is impaired and a decline in the long-term durability is then facilitated. The number-average primary particle diameter of the organosilicon polymer particles can be controlled by changing the production conditions for the organosilicon polymer particles.

The absolute value of the difference (ΔSP) between the SP value ($SP_{Si}$) of the organosilicon polymer particles and the SP value ($SP_{Sh}$) of the thermoplastic resin present in the shell layer is not more than 2.30, preferably not more than 1.60, and more preferably not more than 1.30. When ΔSP is in the indicated range, wicking of the melted shell layer to and by the organosilicon polymer particles due to capillary action is facilitated when the toner shell layer begins to melt during fixing. As a result, connection between adjacent melted toner is facilitated and the low-temperature fixability is readily enhanced. When ΔSP is larger than 2.30, wicking to and by the organosilicon polymer particles is impaired even when the toner shell layer begins to melt during fixing, and because of this obtaining an effect on the low-temperature fixability is impaired. The lower limit for ΔSP is not particularly limited, but at least 0.00 is preferred, at least 0.20 is more preferred, and at least 0.50 is still more preferred.

The SP value ($SP_{Si}$) of the organosilicon polymer particles is preferably 7.50 to 10.90 and is more preferably 7.80 to 9.50. When $SP_{Si}$ is in this range, the effect on the long-term durability is readily obtained in particular in high-temperature, high-humidity environments. $SP_{Si}$ can be controlled by changing the composition of the organosilicon polymer particles. The SP value ($SP_{Sh}$) of the thermoplastic resin present in the shell layer is preferably 9.00 to 10.90 and is more preferably 9.30 to 10.20. When $SP_{Sh}$ is in this range, the effect on the long-term durability is readily obtained in particular in high-temperature, high-humidity environments. $SP_{Sh}$ can be controlled by changing the composition of the thermoplastic resin.

The glass transition temperature Tg of the thermoplastic resin, according to measurement by differential scanning calorimetry DSC, is preferably 40° C. to 75° C. and is more preferably 50° C. to 70° C. When Tg is in this range, coexistence among the storability, long-term durability, and low-temperature fixability with good balance thereamong is readily achieved. This Tg can be controlled by changing the composition of and production conditions for the thermoplastic resin.

The average value of the thickness of the shell layer is preferably 5 nm to 250 nm. 10 nm to 150 nm is more preferred. When the thickness is in this range, coexistence among the storability, long-term durability, and low-temperature fixability with good balance thereamong is readily achieved. The thickness of the shell layer can be controlled by changing the amount of addition of the thermoplastic resin that forms the shell layer and by changing the production conditions during shell formation.

The coverage ratio of the core particle by the shell layer is preferably at least 30%. At least 50% is more preferred. The upper limit is not particularly limited, but not more than 100% is preferred and not more than 90% is more preferred. When the coverage ratio is in this range, coexistence among the storability, long-term durability, and low-temperature fixability with good balance thereamong is readily achieved. In addition, uniformity for the toner surface layer is facilitated and the charge distribution is improved and fogging inhibition is facilitated in particular. The coverage ratio by the shell layer can be controlled through the amount of addition of the thermoplastic resin that forms the shell layer and by changing the production conditions during shell formation.

The content of the organosilicon polymer particles in the toner is preferably 0.3 mass % to 10.0 mass %. 0.5 mass % to 8.0 mass % is more preferred. The long-term durability and low-temperature fixability are readily improved when the content is in this range. The content of the organosilicon polymer particles can be controlled through the amount of addition of the organosilicon polymer particles.

The attachment index, calculated using the following formula (I), for the organosilicon polymer particles versus a polycarbonate film, is preferably not more than 4.5. Not more than 4.3 is more preferred. On the other hand, the lower limit is not particularly limited, but is preferably at least 3.5 and more preferably is at least 3.7. When the attachment index is in the indicated range, inhibition of the migration of the organosilicon polymer particles on the toner particle during long-term use is enhanced and improvement in the long-term durability is facilitated. The attachment index for the organosilicon polymer particles can be controlled by changing the production conditions during addition of the organosilicon polymer particles.

attachment index=area ratio $A$ for the organosilicon polymer particles transferred to the polycarbonate film/coverage ratio $B$ by the organosilicon polymer particles at the toner particle surface×100 (I)

The dispersity evaluation index for the organosilicon polymer particles on the toner surface is preferably from 0.5 to 2.0. From 0.5 to 1.5 is more preferred. When this dispersity evaluation index is in the indicated range, toner-to-toner connection of the toner melted during fixing is facilitated and improvement in the low-temperature fixability is facilitated. In addition, the charge distribution is improved and fogging inhibition is facilitated in particular. The dispersity evaluation index of the organosilicon polymer particles can be controlled through changes in the production conditions when the organosilicon polymer particles are added.

The organosilicon polymer particles will now be particularly described. The organosilicon polymer particles are resin particles constituted of a main chain formed by the bonding of oxygen in alternation with organic group-bearing silicon. The method for producing the organosilicon polymer particles is not particularly limited, and, for example, the organosilicon polymer particles can be obtained by the dropwise addition of a silane compound to water with execution of hydrolysis and a condensation reaction in the presence of a catalyst, followed by filtration of the resulting suspension and drying. The number-average primary particle diameter of the organosilicon polymer particles can be controlled through, for example, the type of catalyst, the blending ratios, the temperature at the start of the reaction, and the length of dropwise addition. The catalyst can be exemplified by acidic catalysts such as hydrochloric acid, hydrofluoric acid, and nitric acid, and by basic catalysts such as aqueous ammonia, sodium hydroxide, and potassium hydroxide, but there is no limitation to these.

The organosilicon polymer particles have a structure in which the silicon atom and oxygen atom are bonded in alternation, and preferably have the T3 unit structure given by formula (1) below. In $^{29}$Si-NMR measurement of the organosilicon polymer particles, the proportion of the peak area originating with silicon having the T3 unit structure, to the total peak area originating with all the silicon element contained in the organosilicon polymer particles, is preferably 0.50 to 1.00. 0.60 to 0.98 is more preferred, and 0.70 to 0.95 is still more preferred. When this range is observed, a suitable elasticity can be conferred on the organosilicon polymer particles and the effects with regard to the long-term durability are then readily obtained. The proportion of the peak area originating with silicon having the T3 unit structure can be controlled by changing the type of the organosilicon compounds used in the polymerization that yields the organosilicon polymer particles and in particular by changing the type and/or the proportion of the trifunctional silane.

$$R^1—SiO_{3/2} \quad (1)$$

(In formula (1). $R^1$ represents an alkyl group having from 1 to 6 (preferably from 1 to 4 and more preferably 1 or 2) carbons or a phenyl group.)

The organosilicon polymer particle preferably is a condensation polymer of an organosilicon compound having the structure given by the following formula (2).

(2)

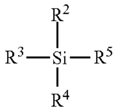

(In formula (2), $R^2$, $R^3$, $R^4$, and $R^5$ each independently represent an alkyl group having from 1 to 6 (preferably from 1 to 4 and more preferably 1 or 2) carbons, a phenyl group, or a reactive group (for example, a halogen atom, hydroxy group, acetoxy group, or alkoxy group (having preferably from 1 to 6 carbons and more preferably from 1 to 3 carbons)).)

An organosilicon compound having tour reactive groups in each formula (2) molecule (tetrafunctional silane), an organosilicon compound having in formula (2) an alkyl group or phenyl group for $R^2$ and three reactive groups ($R^3$, $R^4$, $R^5$) (trifunctional silane), an organosilicon compound having in formula (2) an alkyl group or phenyl group for $R^2$ and $R^3$ and two reactive groups ($R^4$, $R^5$) (difunctional silane), and an organosilicon compound having in formula (2) an alkyl group or phenyl group for $R^2$, $R^3$, and $R^4$ and one reactive group ($R^5$) (monofunctional silane) can be used to obtain the organosilicon polymer particles. The use of at least 50 mol % trifunctional silane for the organosilicon compound is preferred in order to obtain 0.50 to 1.00 for the proportion for the area of the peak originating with the T3 unit structure.

$R^2$ in formula (2) is preferably an alkyl group having from 1 to 6 (preferably from 1 to 4 and more preferably 1 or 2) carbons or a phenyl group. $R^3$, $R^4$, and $R^5$ are preferably each independently a reactive group (halogen atom, hydroxy group, acetoxy group, or alkoxy group (having preferably from 1 to 6 carbons and more preferably from 1 to 3 carbons)).

The organosilicon polymer particle can be obtained by causing the reactive groups to undergo hydrolysis, addition polymerization, and condensation polymerization to form a crosslinked structure. The hydrolysis, addition polymerization, and condensation polymerization of $R^3$, $R^4$, and $R^5$ can be controlled using the reaction temperature, reaction time, reaction solvent, and pH.

The tetrafunctional silane can be exemplified by tetramethoxysilane, tetraethoxysilane, and tetraisocyanatosilane.

The trifunctional silane can be exemplified by methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxycthoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyhrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyhriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, phenyltrihydroxysilane, and pentyhrimethoxysilane.

The difunctional silane can be exemplified by di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethyldimethoxysilane, diethoxydimethylsilane, and diethyldimethoxysilane.

The monofunctional silane can be exemplified by t-butyldimethylchlorosilane, t-butyldimethylmethoxysilane, t-butyldimethylethoxysilane, t-butyldiphenylchlorosilane, t-butyldiphenylmethoxysilane, t-butyldiphenylethoxysilane, chlorodimethylphenylsilane, methoxydimethylphenylsilane, ethoxydimethylphenylsilane, chlorotrimethylsilane, trimethylmethoxysilane, ethoxytrimethylsilane, triethylmethoxysilane, triethylethoxysilane, tripropylmethoxysilane, tributylmethoxysilane, tripentylmethoxysilane, triphenylchlorosilane, triphenylmethoxysilane, and triphenylethoxysilane.

The organosilicon polymer particles may be subjected to a surface treatment with the goal of imparting hydrophobicity.

The hydrophobic treatment agent can be exemplified by chlorosilanes, e.g., methyltrichlorosilane, dimethyldichlorosilane, trimethylchlorosilane, phenyltrichlorosilane, diphenyldichlorosilane, t-butyldimethylchlorosilane, and vinyltrichlorosilane;

alkoxysilanes, e.g., tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, isobutyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, isobutyltriethoxysilane, decyltriethoxysilane, vinyltriethoxysilane, γ-methacryloxypropyltrimethoxysilane, γ-glycidoxypropyltrimethoxysilane, γ-glycidoxypropylnethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane, N-phenyl-3-aminopropyltrimethoxysilane, N-(2-aminoethyl)-3-aminopropyltrimethoxysilane, and N-β-(N-vinylbenzylaminoethyl)-γ-aminopropyltrimethoxysilane;

silazanes, e.g., hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyhetramethyldisilazane, and dimethytetravinyldisilazane;

silicone oils, e.g., dimethylsilicone oil, methylhydrogensilicone oil, methylphenylsilicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, fluorine-modified silicone oil, and terminal-reactive silicone oil:

siloxanes, e.g., hexamethylcyclotrisiloxane, octamethylcyclotetrasiloxane, decamethylcyclopentasiloxane, hexamethyldisiloxane, and octamethyltrisiloxane; and fatty acids and their metal salts, e.g., long-chain fatty acids such as undecylic acid, lauric acid, tridecylic acid, dodecylic acid, myristic acid, palmitic acid, pentadecylic acid, stearic acid, heptadecylic acid, arachidic acid, montanic acid, oleic acid, linoleic acid, and arachidonic acid, as well as salts of these fatty acids with metals such as zinc, iron, magnesium, aluminum, calcium, sodium, and lithium.

The use is preferred among the preceding of alkoxysilanes, silazanes, and silicone oils because they support facile execution of the hydrophobic treatment. A single one of these hydrophobic treatment agents may be used by itself or two or more may be used in combination.

The starting materials used for the toner particle will now be described. Polymers that can be used as the binder resin that forms the core particle of the toner particle are specifically exemplified by the following: homopolymers of styrene and its substituted forms, e.g., polystyrene, poly-p-chlorostyrene, and polyvinyltoluene; styrene copolymers. e.g., styrene-p-chlorostyrene copolymers, styrene-vinyltoluene copolymers, styrene-vinylnaphthalene copolymers, styrene-acrylate ester copolymers, and styrene-methacrylate ester copolymers; as well as polyvinyl chloride, phenolic resins, natural resin-modified phenolic resins, natural resin-modified maleic acid resins, acrylic resins, methacrylic resins, polyvinyl acetate, silicone resins, polyester resins, polyurethane resins, polyamide resins, furan resins, epoxy resins, xylene resins, polyethylene resins, and polypropylene resins.

The core particle preferably contains a release agent. When an ester wax having a melting point preferably 60° C. to 90° C. (more preferably 60° C. to 80° C.) is used as the release agent, the compatibility with the binder resin is then excellent and a plasticizing effect is readily obtained as a result. The ester wax can be exemplified by waxes in which the major component is fatty acid ester, such as carnauba wax and montanic acid ester waxes; waxes provided by the partial or complete deacidification of the acid component from fatty acid esters, such as deacidified carnauba wax; hydroxyl group-containing methyl ester compounds obtained by, e.g., the hydrogenation of plant oils and fats; saturated fatty acid monoesters, e.g., stearyl stearate and behenyl behenate; diesters between a saturated aliphatic dicarboxylic acid and a saturated aliphatic alcohol, e.g., di behenyl sebacate, distearyl dodecanedioate, and distearyl octadecanedioate; and diesters between a saturated aliphatic diol and a saturated aliphatic monocarboxylic acid, e.g., nonanediol dibehenate and dodecanediol distearate.

Among these waxes, the incorporation is preferred of a difunctional ester wax (diester), which has two ester bonds in the molecular structure. The difunctional ester wax is an ester compound between a dihydric alcohol and an aliphatic monocarboxylic acid or an ester compound between a dibasic carboxylic acid and an aliphatic monoalcohol. The aliphatic monocarboxylic acid is specifically exemplified by myristic acid, palmitic acid, stearic acid, arachidic acid, behenic acid, lignoceric acid, cerotic acid, montanic acid, melissic acid, oleic acid, vaccenic acid, linoleic acid, and linolenic acid. The aliphatic monoalcohol is specifically exemplified by myristyl alcohol, cetanol, stearyl alcohol, arachidyl alcohol, behenyl alcohol, tetracosanol, hexacosanol, octacosanol, and triacontanol.

Specific examples of the dibasic carboxylic acid are butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), dodecanedioic acid, tridecanedioic acid, tetradecanedioic acid, hexadecanedioic acid, octadecanedioic acid, eicosanedioic acid, phthalic acid, isophthalic acid, and terephthalic acid. Specific examples of the dihydric alcohol are ethylene glycol, propylene glycol, 1,3-propanediol, 1,4-butanediol, 1,5-pentanediol, 1,6-hexanediol, 1,10-decanediol, 1,12-dodecanediol, 1,14-tetradecanediol, 1,16-hexadecanediol, 1,18-octadecanediol, 1,20-eicosanediol, 1,30-triacontanediol, diethylene glycol, dipropylene glycol, 2,2,4-trimethyl-1,3-pentanediol, neopentyl glycol, 1,4-cyclohexanedimethanol, spiroglycol, 1,4-phenylene glycol, bisphenol A, and hydrogenated bisphenol A.

Other usable release agents can be exemplified by petroleum-based waxes such as paraffin waxes, microcrystalline waxes, and petrolatum, and derivatives thereof; montan wax and derivatives thereof; hydrocarbon waxes produced by the Fischer-Tropsch method, and derivatives thereof; polyolefin waxes such as polyethylene and polypropylene, and derivatives thereof; natural waxes such as carnauba wax and candelilla wax, and derivatives thereof; higher aliphatic alcohols; and fatty acids such as stearic acid and palmitic acid. The content of the release agent is preferably 5.0 mass parts to 20.0 mass parts per 100.0 mass parts of the binder resin.

The core particle may contain a colorant. The colorant can be exemplified by the following. Black colorants can be exemplified by carbon black and black colorants provided by color mixing, using a yellow colorant, magenta colorant, and cyan colorant, to give a black color. A pigment may be used by itself for the colorant, but bringing about an enhanced definition through the co-use of a dye and pigment is more preferred in terms of the quality of the full color image.

Pigments for magenta toners can be exemplified by the following: C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C.I. Pigment Violet 19; and C.I. Vat Red 1, 2, 10, 13, 15, 23, 29, and 35. Dyes for magenta toners can be exemplified by the following: oil-soluble dyes such as C.I. Solvent Red 1, 3, 8, 23, 24, 25, 27, 30, 49, 81, 82, 83, 84, 100, 109, and 121; C.I. Disperse Red 9; C.I. Solvent Violet 8, 13, 14, 21, and 27; and C.I. Disperse Violet 1, and by basic dyes such as C.I. Basic Red 1, 2, 9, 12, 13, 14, 15, 17, 18, 22, 23, 24, 27, 29, 32, 34, 35, 36, 37, 38, 39, and 40 and C.I. Basic Violet 1, 3, 7, 10, 14, 15, 21, 25, 26, 27, and 28.

Pigments for cyan toners can be exemplified by the following: C.I. Pigment Blue 2, 3, 15:2, 15:3, 15:4, 16, and 17; C.I. Vat Blue 6; C.I. Acid Blue 45; and copper phthalocyanine pigments in which 1 to 5 phthalimidomethyl groups are substituted on the phthalocyanine skeleton. Dyes for cyan toners can be exemplified by C.I. Solvent Blue 70. Pigments for yellow toners can be exemplified by the following: C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185, and C.I. Vat Yellow 1, 3, and 20.

Dyes for yellow toners can be exemplified by C.I. Solvent Yellow 162.

A single one of these colorants may be used or a mixture may be used, and these colorants may also be used in a solid solution state. The colorant is selected considering the hue angle, chroma, lightness, lightfastness, OHP transparency, and dispersibility in the toner. The content of the colorant is preferably from 0.1 mass parts to 30.0 mass parts per 100.0 mass parts of the binder resin.

A magnetic toner particle may also be prepared by incorporating a magnetic body as colorant in the core particle. The magnetic body can be exemplified by iron oxides such as magnetite, hematite, and ferrite; metals such as iron, cobalt, and nickel; and alloys and mixtures of these metals with a metal such as aluminum, copper, magnesium, tin, zinc, beryllium, calcium, manganese, selenium, titanium, tungsten, and vanadium. These magnetic bodies are more preferably magnetic bodies that have undergone a surface modification.

When a magnetic toner is prepared by a polymerization method, a hydrophobic treatment is preferably executed using a surface-modifying agent that is a substance that does not inhibit polymerization. Such a surface-modifying agent can be exemplified by silane coupling agents and titanium coupling agents. The number-average particle diameter of these magnetic bodies is preferably not greater than 2.0 μm and is more preferably from 0.1 μm to 0.5 μm. The content of the magnetic body, expressed per 100 mass parts of the binder resin, is preferably from 20 mass parts to 200 mass parts and is more preferably from 40 mass parts to 150 mass parts.

The core particle may contain a charge control agent. The following are examples of charge control agents that control toner to a negative chargeability: organometal compounds and chelate compounds such as monoazo metal compounds, acetylacetone-metal compounds, and metal compounds of aromatic oxycarboxylic acids, aromatic dicarboxylic acids, oxycarboxylic acids, and dicarboxylic acids. Also included in addition to the preceding are, e.g., aromatic oxycarboxylic acids, aromatic monocarboxylic acids, and aromatic polycarboxylic acids and their metal salts, anhydrides, and esters, and phenol derivatives such as bisphenol. Additional examples are urea derivatives, metal-containing salicylic acid compounds, metal-containing naphthoic acid compounds, boron compounds, quaternary ammonium salts, and calixarene.

On the other hand, charge control agents that control toner to a positive chargeability can be exemplified by the following: nigrosine and nigrosine modifications by, e.g., fatty acid metal salts; guanidine compounds; imidazole compounds; quaternary ammonium salts such as tributylbenzylammonium 1-hydroxy-4-naphthosulfonate, tetrabutylammonium tetrafluoroborate, and (3-acrylamidopropyl) trimethylammonium chloride, and their onium salt analogues, such as phosphonium salts, and their lake pigments; triphenylmethane dyes and their lake pigments (the laking agent is exemplified by phosphotungstic acid, phosphomolybdic acid, phosphomolybdotungstic acid, tannic acid, lauric acid, gallic acid, ferricyanides, and ferrocyanides); metal salts of higher fatty acids; and resin-type charge control agents. A single one of these charge control agents may be incorporated by itself, or a combination of at least two may be incorporated. The amount of addition of the charge control agent is preferably 0.01 mass parts to 10.00 mass parts per 100.0 mass parts of the binder resin or polymerizable monomer that produces the binder resin.

Methods for producing the core particle of the toner particle will now be described. A known means can be used as the method of core particle production, and a kneading pulverization method, or a wet production method, e.g., the suspension polymerization method, emulsion polymerization and aggregation method, or emulsion aggregation method, can be used.

The core particle is produced in the suspension polymerization method via a granulation step and a polymerization step. In the granulation step, a polymerizable monomer composition, containing polymerizable monomer that can produce the binder resin along with optional additives such as colorant and wax, is dispersed in an aqueous medium to form droplet particles of the polymerizable monomer composition. In the polymerization step, the polymerizable monomer in the droplet particles is polymerized to produce core particles. Vinyl polymerizable monomers are examples of preferred polymerizable monomers. Specific examples are as follows.

For example, styrene; styrene derivatives such as α-methylstyrene, β-methylstyrene, o-methylstyrene, m-methylstyrene, p-methylstyrene, and 2,4-dimethylstyrene; acrylic polymerizable monomers such as methyl acrylate, ethyl acrylate, n-propyl acrylate, isopropyl acrylate, n-butyl acrylate, isobutyl acrylate, tert-butyl acrylate, and 2-ethylhexyl acrylate; methacrylic polymerizable monomers such as methyl methacrylate, ethyl methacrylate, n-propyl methacrylate, isopropyl methacrylate, n-butyl methacrylate, isobutyl methacrylate, and tert-butyl methacrylate; esters of methylene aliphatic monocarboxylic acids; and vinyl esters such as vinyl acetate, vinyl propionate, vinyl benzoate, vinyl butyrate, and vinyl formate.

The emulsion aggregation method is a method in which an aqueous dispersion of fine particles is preliminarily prepared, wherein the fine particles are composed of the materials that constitute the toner particle (core particle) and are sufficiently smaller than a target particle diameter; these fine particles are aggregated in the aqueous medium until the particle diameter of the toner is reached; and the resin is melt-adhered by heating to produce the toner.

The emulsion aggregation method preferably has a dispersion step of preparing respective fine particle dispersions containing the constituent materials of the toner (core particle); an aggregation step of obtaining aggregated particles by aggregating the fine particles that contain the constituent materials of the toner (core particle) while controlling the particle diameter to the particle diameter of the toner (core particle); and a coalescence step of melt-bonding the resin contained in the resulting aggregated particles. As necessary, this is followed by a cooling step; a filtration/washing step of filtering off the obtained toner (core particle) and washing with, e.g., deionized water; and a step of drying to remove the moisture in the washed toner (core particle).

An example of a method for producing the core particle of the toner particle by a kneading pulverization method is described in the following. In a starting material mixing step, the materials constituting the core particle, e.g., the binder and optional additives such as the colorant and wax, are metered out in prescribed amounts and blended and mixed. The mixing apparatus can be exemplified by the double cone mixer, V-mixer, drum mixer, Supermixer, FM mixer, Nauta mixer, Mechano Hybrid (Nippon Coke & Engineering Co., Ltd.), and so forth.

The mixed materials are then melt-kneaded to disperse the colorant, wax, and so forth in the binder resin. A batch kneader, e.g., a pressure kneader, Banbury mixer, and so forth, or a continuous kneader can be used in the melt-kneading step. Single-screw extruders and twin-screw extruders represent the mainstream here because they offer the advantage of enabling continuous production. Examples here are the Model KTK twin-screw extruder (Kobe Steel, Ltd.), Model TEM twin-screw extruder (Toshiba Machine Co., Ltd.), PCM kneader (Ikegai Corp.), Twin Screw Extruder (KCK), Co-Kneader (Buss), and Kneadex (Nippon Coke & Engineering Co., Ltd.). The resin composition yielded by melt kneading may additionally be rolled out using, for example, a two-roll mill, and cooled in a cooling step, for example, with water.

The resulting cooled resin composition is then pulverized to a desired particle diameter in a pulverization step. In the pulverization step, for example, a coarse pulverization is performed using a grinder such as a crusher, hammer mill, or feather mill. This is followed by a fine pulverization using, for example, a pulverizer such as a Kryptron System (Kawasaki Heavy Industries, Ltd.), Super Rotor (Nisshin Engineering Inc.), or Turbo Mill (Freund-Turbo Corporation) or using an air jet system.

The core particle is then obtained as necessary by carrying out classification using a sieving apparatus or a classifier, e.g., an internal classification system such as the Elbow Jet (Nittetsu Mining Co., Ltd.) or a centrifugal classification system such as the Turboplex (Hosokawa Micron Corporation), TSP Separator (Hosokawa Micron Corporation), or Faculty (Hosokawa Micron Corporation).

The core particle may be subjected to a spheronizing treatment. For example, after pulverization a spheronizing treatment may be carried out using a Hybridization System (Nara Machinery Co., Ltd.), Mechanofusion System (Hosokawa Micron Corporation). Faculty (Hosokawa Micron Corporation), or Meteo Rainbow MR Type (Nippon Pneumatic Mfg. Co., Ltd.). The glass transition temperature (Tg) of the core particle is, from the perspective of the low-temperature fixability, preferably from 40° C. to 60° C.

The shell layer of the toner particle will now be described. A thermoplastic resin that provides an absolute value for the difference ΔSP of not more than 2.30 between the SP value $SP_{Si}$ of the organosilicon polymer particles and the SP value $SP_{Si}$ of the thermoplastic resin present in the shell layer, can be used for the thermoplastic resin present in the shell layer. The following, for example, can be used for the thermoplastic resin present in the shell layer; homopolymers of styrene and its substituted forms, e.g., polystyrene, poly-p-chlorostyrene, and polyvinyltoluene; styrene copolymers. e.g., styrene-p-chlorostyrene copolymers, styrene-vinyltoluene copolymers, styrene-vinylnaphthalene copolymers, styrene-acrylate ester copolymers, and styrene-methacrylate ester copolymers; as well as polyvinyl chloride, phenolic resins, natural resin-modified phenolic resins, natural resin-modified maleic acid resins, acrylic resins, methacrylic resins, polyvinyl acetate, silicone resins, polyester resins, furan resins, epoxy resins, xylene resins, polyethylene resins, and polypropylene resins.

From the standpoint of ΔSP, the thermoplastic resin preferably contains a vinyl polymer and more preferably is a vinyl polymer. The polymerizable monomer can be exemplified by the following vinyl polymerizable monomers: for example, styrene; styrene derivatives such as α-methylstyrene, β-methylstyrene, o-methylstyrene, m-methylstyrene, p-methylstyrene, and 2,4-dimethylstyrene; acrylic polymerizable monomers such as methyl acrylate, ethyl acrylate, n-propyl acrylate, isopropyl acrylate, n-butyl acrylate, isobutyl acrylate, tert-butyl acrylate, and 2-ethylhexyl acrylate; methacrylic polymerizable monomers such as methyl methacrylate, ethyl methacrylate, n-propyl methacrylate, isopropyl methacrylate, n-butyl methacrylate, isobutyl methacrylate, tert-butyl methacrylate, and ethylene glycol dimethacrylate; esters of methylene aliphatic monocarboxylic acids; and vinyl esters such as vinyl acetate, vinyl propionate, vinyl benzoate, vinyl butyrate, and vinyl formate. Preferred are polymers of styrene and at least one selection from the group consisting of acrylic polymerizable monomers and methacrylic polymerizable monomers.

There are no particular limitations on the method for forming the shell layer on the core particle surface to obtain the toner particle. When the core particle is produced by a production method that includes a wet step, e.g., a suspension polymerization method, emulsion polymerization and aggregation method, emulsion aggregation method, and so forth, the shell layer can be formed by the addition of the thermoplastic resin that will form the shell layer to the liquid after core particle production. When the core particle is produced by a pulverization method, the shell layer can be formed after core particle production by the addition of the thermoplastic resin after the core particles have been dispersed in an aqueous medium.

In either case, the shell layer may be formed by the addition of the shell layer-forming thermoplastic resin as a dispersion or the shell layer may be formed by the addition to the dispersed core particle of starting monomer for the shell layer and the execution of a polymerization reaction. The shell layer may also be formed by adding a dry powder of thermoplastic resin fine particles to the core itself in dry powder form. In the case of the addition to the core particle of the shell layer thermoplastic resin in the form of fine particles, the shell layer may also be provided by the generation, by the application of heat, of a film from the finely particulate resin attached to the core particle.

The content of the shell layer-forming thermoplastic resin, expressed per 100 mass parts of the binder resin, is preferably from 0.01 mass parts to 20.0 mass parts and is more preferably from 0.5 mass parts to 10.0 mass parts. The content of the thermoplastic resin in the shell layer is preferably at least 50 mass %, at least 70 mass %, at least 80 mass %, at least 90 mass %, or at least 95 mass %. The upper limit is not particularly limited, but not more than 100 mass % is preferred. Any combination of these numerical value ranges may be used. The shell layer more preferably is a thermoplastic resin.

The toner can be obtained by mixing the toner particle with the organosilicon polymer particles and any other optional external additive. The mixer used to mix the external additive with the toner particle can be exemplified by the FM mixer (Nippon Coke & Engineering Co., Ltd.), Supermixer (Kawata Mfg. Co., Ltd.), Nobilta (Hosokawa Micron Corporation), and Hybridizer (Nara Machinery Co., Ltd.).

After the external additive has been admixed, the coarse particles may be removed by screening. The screening devices used for this purpose can be exemplified by the following: Ultrasonic (Koei Sangyo Co., Ltd.), Rezona Sieve and Gyro-Sifter (Tokuju Corporation), Vibrasonic System (Dalton Co., Ltd.), Soniclean (Sintokogio, Ltd.), Turbo Screener (Freund-Turbo Corporation), and Micro-sifter (Makino Mfg. Co., Ltd.).

The toner may contain additional external additive other than the organosilicon polymer particles. In particular, a flowability improver may be added in order to improve the flowability and charging performance of the toner.

The following may be used as this flowability improver: for example, fluororesin powders such as vinylidene fluoride fine powder and polytetrafluoroethylene fine powder; fine powders of silica fine particles, such as wet production method silica and dry production method silica, fine powders of titanium oxide fine particles, and fine powders of alumina fine particles; hydrophobed silica fine particles provided by subjecting the aforementioned fine particles to surface treatment with a hydrophobic treatment agent, e.g., a silane compound, titanium coupling agent, or silicone oil; oxides such as zinc oxide and tin oxide; composite oxides such as strontium titanate, barium titanate, calcium titanate, strontium zirconate, and calcium zirconate; and carbonate salt compounds such as calcium carbonate and magnesium carbonate.

Among the preceding, the fine particles produced by the vapor-phase oxidation of a silicon halide compound are a preferred flowability improver. Dry production method silica fine particles, referred to as dry silica or fumed silica, are preferred. The dry production method utilizes, for example, the pyrolytic oxidation reaction of silicon tetrachloride gas in an oxyhydrogen flame and has the following basic reaction equation.

$$SiCl_4+2H_2+O_2 \rightarrow SiO_2+4HCl$$

Composite fine particles of silica and another metal oxide may also be obtained by the use in this production step of another metal halide compound, e.g., aluminum chloride, titanium chloride, and so forth, in combination with the silicon halide compound, and these composite fine particles are also included as silica fine particles. A high charging performance and a high flowability can be provided when this flowability improver has a number-average primary particle diameter of from 5 nm to 10 nm, which is thus preferred. Hydrophobed silica fine particles that have been subjected to a surface treatment with a hydrophobic treatment agent are more preferred for the flowability improver. The flowability improver preferably has a specific surface area, as measured by the BET method using nitrogen adsorption, of from 30 $m^2/g$ to 300 $m^2/g$. The content of the flowability improver is preferably from 0.01 mass parts to 3.0 mass parts per 100 mass parts of the toner particle.

The methods used to measure the various properties are described herebelow.

Method for Measuring Number-Average Primary Particle Diameter of Organosilicon Polymer Particles Measurement of the number-average primary particle diameter of the organosilicon polymer particles is performed using an "S-4800" scanning electron microscope (product name, Hitachi. Ltd.). Observation is carried out on the toner to which organosilicon polymer particles have been added; in a visual field enlarged by a maximum of 50,000×, the long diameter of the primary particles of 100 randomly selected organosilicon polymer particles is measured; and the number-average particle diameter is determined. The enlargement factor in the observation is adjusted as appropriate depending on the size of the organosilicon polymer particles.

When the organosilicon polymer particles can be independently acquired as such, measurement can also be performed on these organosilicon polymer particles as such. When the toner contains silicon-containing material other than the organosilicon polymer particles, EDS analysis is carried out on the individual particles of the external additive during observation of the toner and the determination is made, based on the presence/absence of a peak for the element Si, as to whether the analyzed particles are organosilicon polymer particles.

When the toner contains both organosilicon polymer particles and silica fine particles, the organosilicon polymer particles are identified by comparing the ratio (Si/O ratio) for the Si and O element contents (atomic %) with a standard. EDS analysis is carried out under the same conditions on standards for both the organosilicon polymer particles and silica fine particles to obtain the element content (atomic %) for both the Si and O. Using A for the Si/O ratio for the organosilicon polymer particles and B for the Si/O ratio for the silica fine particles, measurement conditions are selected whereby A is significantly larger than B. Specifically, the measurement is run ten times under the same conditions on the standards and the arithmetic mean value is obtained for both A and B. Measurement conditions are selected whereby the obtained average values satisfy $A/B>1.1$.

When the Si/O ratio for a fine particle to be classified is on the A side from $[(A+B)/2]$, the fine particle is then scored as an organosilicon polymer particle. Tospearl 120A (Momentive Performance Materials Japan LLC) is used as the standard for the organosilicon polymer particles, and HDK V15 (Asahi Kasei Corporation) is used as the standard for the silica fine particles.

Identification of the Organosilicon Polymer Particles and Confirmation of the T3 Unit Structure Pyrolysis gas chromatography/mass spectrometry (also referred to hereafter as "pyrolysis GC/MS") and NMR are used to identify the composition and ratios of the constituent compounds of the organosilicon polymer particles present in the toner. When the toner contains a silicon-containing material and/or external additive other than the organosilicon polymer particles, the toner is dispersed in a solvent, e.g., chloroform, and the organosilicon polymer particles are then separated based on specific gravity differences using, e.g., centrifugal separation. This method is as follows. First, 1 g of the toner is added to and dispersed into 31 g of chloroform filled into a vial and, e.g., the organosilicon polymer particles, other external additive, and so forth, are separated from the toner. The dispersion is prepared by treating for 30 minutes using an ultrasound homogenizer for dispersion. The treatment conditions are as follows.

Ultrasound treatment instrument: VP-050 ultrasound homogenizer (TIETECH Co., Ltd.)

Microchip: stepped microchip, 2 mmφ end diameter

Position of microchip end: center of glass vial, 5 mm height from bottom of vial Ultrasound conditions: 30% intensity, 30 minutes During this treatment, the ultrasound is applied while cooling the vial with ice water to prevent the temperature of the dispersion from rising. The dispersion is transferred to a glass tube (50 mL) for swing rotor service and centrifugal separation is carried out using a centrifugal separator (H-9R, Kokusan Co., Ltd.) and conditions of 58.33 $S^{-1}$ and 30 minutes. Based on the specific gravity, centrifugal separation can provide separation within the glass tube of a fraction that contains primarily the organosilicon polymer particles. The resulting fraction is dried under vacuum conditions (40° C./24 hours) to obtain the sample. When the organosilicon polymer particles can be acquired as such, the organosilicon polymer particles may then also be measured as such.

Using the sample obtained by the above or organosilicon polymer particles, the abundance of the constituent compounds of the organosilicon polymer particles and proportion for the T3 unit structure in the organosilicon polymer particles is then measured and calculated using solid-state $^{29}$Si-NMR. Pyrolysis GC/MS is used for analysis of the species of constituent compounds of the organosilicon polymer particles. The species of constituent compounds of the organosilicon polymer particles are identified by analysis of the mass spectrum of the pyrolyzate components derived from the organosilicon polymer particles and produced by pyrolysis of the organosilicon polymer particles at 550° C. to 700° C. Specific measurement method is as follows.

[Measurement Conditions for Pyrolysis GC-MS]

pyrolysis instrument: JPS-700 (Japan Analytical Industry Co., Ltd.)

pyrolysis temperature: 590° C.

GC/MS instrument: Focus GC/ISQ (Thermo Fisher)

column: HP-5MS, 60 m length, 0.25 mm inner diameter, 0.25 μm film thickness injection port temperature: 200° C.

flow pressure: 100 kPa split: 50 mL/min

MS ionization: EI ion source temperature: 200° C.

mass range 45 to 650

The abundance of the identified constituent compounds of the organosilicon polymer particles is then measured and calculated using solid-state $^{29}$Si-NMR. In solid-state $^{29}$Si-NMR, peaks are detected in different shift regions depending on the structure of the functional groups bonded to the Si in the constituent compounds of the organosilicon polymer particles. The structure of the functional groups of each peak can be identified by using a reference sample. The abundance of each constituent compound can be calculated from the obtained peak areas. The determination can be carried out by calculating the proportion for the peak area for the T3 unit structure with respect to total peak area. The measurement conditions for the solid-state $^{29}$Si-NMR are as follows.

instrument: JNM-ECX5002 (JEOL RESONANCE)

temperature: room temperature measurement method: DDMAS method, $^{29}$Si, 45° sample tube: zirconia 3.2 mmφ sample: filled in powder form into the sample tube sample rotation rate: 10 kHz relaxation delay: 180 s scans: 2000

After this measurement, peak separation is performed, for the chloroform-insoluble matter of the organosilicon polymer particles, into the following structure X1, structure X2, structure X3, and structure X4 by curve fitting for silane components having different substituents and bonding groups, and their respective peak areas are calculated. The structure X3 indicated below is the T3 unit structure.

structure X1: $(Ri)(Rj)(Rk)SiO_{1/2}$ (A1)

structure X2: $(Rg)(Rh)Si(O_{1/2})_2$ (A2)

structure X3: $RmSi(O_{1/2})_3$ (A3)

structure X4: $Si(O_{1/2})_4$ (A4)

X1

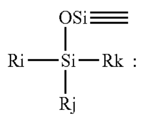

(A1)

X2

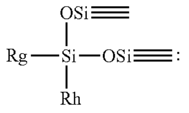

(A2)

X3

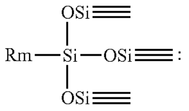

(A3)

X4

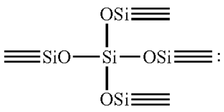

(A4)

The Ri, Rj, Rk, Rg, Rh, and Rm in formulas (A1), (A2), and (A3) represent a silicon-bonded organic group, e.g., a hydrocarbon group having from 1 to 6 carbons, halogen atom, hydroxy group, acetoxy group, or alkoxy group. The hydrocarbon group represented by the aforementioned $R^1$ is identified by $^{13}C$-NMR.

Measurement Conditions for $^{13}C$-NMR (Solid State)

instrument: JNM-ECXS0011 from JEOL RESONANCE, Inc.

sample tube: 3.2 mmφ sample: filled in powder form into the sample tube measurement temperature: room temperature pulse mode: CP/MAS measurement nucleus frequency: 123.25 MHz ($^{13}C$)

reference material: adamantane (external reference: 29.5 ppm)

sample rotation rate: 20 kHz contact time: 2 ms retardation time: 2 s number of integrations: 1024

In this method, the hydrocarbon group represented by $R^1$ is confirmed by the presence/absence of a signal originating with, e.g., the silicon atom-bonded methyl group ($Si—CH_3$), ethyl group ($Si—C_2H_5$), propyl group ($Si—C_3H_7$), butyl group ($Si—C_4H_9$), pentyl group ($Si—C_5H_{11}$), hexyl group ($Si—C_6H_{33}$), or phenyl group ($Si—C_6H_5$). When a finer structural discrimination is necessary, identification may be carried out using the results of $^1H$-NMR measurement together with the results of the aforementioned $^{13}C$-NMR measurement and $^{29}Si$-NMR measurement.

Method for Quantitating the Organosilicon Polymer Particles Present in the Toner The content of the organosilicon polymer particles present in the toner is measured using x-ray fluorescence. The x-ray fluorescence measurement is based on JIS K 0119-1969, and specifically is carried out as follows. An "Axios" wavelength-dispersive x-ray fluorescence analyzer (PANalytical B.V.) is used as the measurement instrument, and the "SuperQ ver. 5.0L" (PANalytical B.V.) software provided with the instrument is used in order to set the measurement conditions and analyze the measurement data. Rh is used for the x-ray tube anode; a vacuum is used for the measurement atmosphere; and the measurement diameter (collimator mask diameter) is 27 mm. With regard to the measurement, measurement is carried out using the Omnian method in the element range from F to U, and detection is carried out with a proportional counter (PC) in the case of measurement of the light elements and with a scintillation counter (SC) in the case of measurement of the heavy elements.

The acceleration voltage and current value for the x-ray generator are established so as to provide an output of 2.4 kW. For the measurement sample, 4 g of the toner is introduced into a specialized aluminum compaction ring and is smoothed over, and, using a "BRE-32" tablet compression molder (Maekawa Testing Machine Mfg. Co., Ltd.), a pellet is produced by molding to a thickness of 2 mm and a diameter of 39 mm by compression for 60 seconds at 20 MPa, and this pellet is used as the measurement sample.

X-ray exposure is carried out on the pellet molded under the aforementioned conditions, and the resulting characteristic x-rays (fluorescent x-rays) are dispersed with a dispersion element. The intensity of the fluorescent x-rays dispersed at the angle corresponding to the wavelength specific to each element contained in the sample is analyzed by the fundamental parameter method (FP method), the content ratio for each element contained in the toner is obtained as a result of the analysis, and the silicon atom content in the toner is determined.

The content of the organosilicon polymer particles in the toner can be obtained by calculation from the relationship between the silicon content in the toner that is determined by x-ray fluorescence and the content ratio for the silicon in the constituent compounds of the organosilicon polymer particles for which the structure has been established using, e.g., solid-state $^{29}Si$-NMR and pyrolysis GC-MS. When a silicon-containing material other than the organosilicon polymer particles is contained in the toner, using the same methods as described above, a sample provided by the removal from the toner of the silicon-containing material other than the organosilicon polymer particles, can be obtained and the organosilicon polymer particles contained in the toner can be quantitated.

Method for Measuring the Peak Top Molecular Weight of the Thermoplastic Resin Present in the Shell Layer The peak top molecular weight of the thermoplastic resin present in the shell layer is measured as follows using gel permeation chromatography (GPC). First, the thermoplastic resin is dissolved in tetrahydrofuran (THF) at room temperature. The obtained solution is filtered using a "Sample Pretreatment Cartridge" (Tosoh Corporation) solvent-resistant membrane filter having a pore diameter of 0.2 μm to obtain a sample solution. The sample solution is adjusted to a concentration of THF-soluble component of 0.8 mass %. Measurement is carried out under the following conditions using this sample solution.

Instrument: "HLC-8220GPC" high-performance GPC instrument [Tosoh Corporation]
Column: 2×LF-604 [Showa Denko Kabushiki Kaisha]
Eluent: THF
Flow rate: 0.6 mL/min
Oven temperature: 40° C.
Sample injection amount: 0.020 mL A molecular weight calibration curve constructed using polystyrene resin standards (product name "TSK Standard Polystyrene F-850, F-450, F-288, F-128, F-80, F40, F-20, F-10, F-4, F-2, F-1, A-5000, A-2500, A-1000, A-500", Tosoh Corporation) is used to determine the molecular weight of the sample.

The method used to isolate the resin constituting the shell layer from the toner will now be described. The resin constituting the shell layer is separated by gradient separation using gradient polymer elution chromatography (instrument name: UltiMate 3000 HPLC, Thermo Fisher Scientific Inc.) and is isolated by fractionation.

The toner is dissolved in chloroform to prepare a 1 mass % solution of the toner. This toner solution is injected onto the gradient polymer elution chromatograph and a chromatogram is obtained using a solvent gradient. The resin constituting the shell layer is isolated by assigning the peak components on the obtained chromatogram; re-injecting the toner solution; fractionating the individual components using a fractionation unit; and drying. The conditions in this gradient polymer elution chromatography are as follows.

Eluent: gradient from 100% acetonitrile ACN to 100% chloroform (25 minutes)
Column: ODS column
Column oven: 40° C.
Flow rate: 1 mL/min Identification of the Thermoplastic Resin Present in the Shell Layer Pyrolysis gas chromatography/mass spectrometry (also referred to hereafter as "pyrolysis GC/MS") and NMR are used to identify the composition and ratios of the constituent compounds of the thermoplastic resin of the shell layer. When the thermoplastic resin of the shell layer can be acquired as such, the thermoplastic resin of the shell layer may then also be measured as such. Pyrolysis GC/MS is used for analysis of the species of the constituent compounds of the thermoplastic resin of the shell layer. Identification of the species of the constituent compounds of the thermoplastic resin of the shell layer is carried out by pyrolysis of the thermoplastic resin of the shell layer at 55° C. to 700° C. and analysis of the mass spectrum of the components in the pyrolyzate of the thermoplastic resin of the shell layer. The specific measurement conditions are provided below.

Measurement Conditions for Pyrolysis GC-MS

Pyrolysis instrument: JPS-700 (Japan Analytical Industry Co., Ltd.)
Pyrolysis temperature: 590° C.
GC/MS instrument: Focus GC/ISQ (Thermo Fisher)
Column: HP-5MS, length of 660 m, inner diameter of 0.25 mm, film thickness of 0.25 μm
Injection port temperature: 200° C.
Flow pressure: 100 kPa
Split: 50 mL/min
MS ionization: EI
Ion source temperature: 200° C.
Mass range: 45-650

The occurrence ratios of the identified constituent compounds of the thermoplastic resin of the shell layer are then measured and calculated using solid-state $^1$H-NMR. Structural determination is performed using nuclear magnetic resonance spectroscopic analysis ($^1$H-NMR) [400 MHz, $CDCl_3$, room temperature (25° C.)].

Measurement instrument: JNM-EX400 FT-NMR instrument (JEOL Ltd.)
Measurement frequency: 400 MHz
Pulse condition: 5.0 μs
Frequency range: 10500 Hz
Number of scans: 64

The molar ratios for the individual monomer components are determined from the integration values in the obtained spectrum and the compositional ratios (mol %) are calculated based on these. With regard to confirmation of whether the resin isolated from the shell layer is a thermoplastic resin, it can be regarded as a thermoplastic resin if the resin has a glass transition temperature Tg and the resin softens when this temperature is reached.

Method for Measuring the Glass Transition Temperature Tg of the Thermoplastic Resin Present in the Shell The glass transition temperature Tg of the thermoplastic resin present in the shell is measured using a "Q1000" differential scanning calorimeter (TA Instruments) in accordance with ASTM D 3418-82. Temperature correction in the instrument detection section uses the melting points of indium and zinc, and correction of the amount of heat uses the heat of fusion of indium. Specifically, 3 mg of the sample is exactly weighed out and introduced into an aluminum pan; an empty aluminum pan is used for reference. These are measured at a ramp rate of 10° C./min in the measurement temperature range of 30° C. to 200° C. For the measurement, the temperature is raised at a ramp rate of 10° C./min to 200° C., then reduced at a ramp down rate of 10° C./min to 30° C., and then raised again at a ramp rate of 10° C./min. Using the DSC curve obtained in this second ramp up step, the glass transition temperature Tg (° C.) is taken to be the point at the intersection between the DSC curve and the line for the midpoint for the baselines for prior to and subsequent to the appearance of the change in the specific heat. The method for isolating the thermoplastic resin present in the shell layer is as described in the Method for Measuring the Peak Top Molecular Weight of the Thermoplastic Resin Present in the Shell Layer.

Method for Calculating the Solubility Parameter (SP Value)

The SP value ($SP_{Si}$) of the organosilicon polymer particles and the SP value ($SP_{Sh}$) of the thermoplastic resin present in the shell layer are determined, using the following equation according to Fedors, based on the results of the previously described identification of the organosilicon polymer particles and the thermoplastic resin present in the shell layer. For the values of Δei and Δvi, reference is made to "Energies of Vaporization and Molar Volumes (25° C.) of Atoms and Atomic Groups" in Tables 3-9 of "Basic Coating Science" (pp. 54-57, 1986 (Maki Shoten Publishing)). The unit for the SP value is $(cal/cm^3)^{1/2}$, but this can be converted to the $(J/m^3)^{1/2}$ unit using 1 $(cal/cm^3)^{1/2}=2.046\times10^3$ $(J/m^3)^{1/2}$.

$$\delta i=(Ev/V)^{1/2}=(\Delta ei/\Delta vi)^{1/2}$$

Ev: energy of vaporization
V: molar volume
Δei: energy of vaporization of the atoms or atomic groups of component i
Δvi: molar volume of the atoms or atomic groups of component i Method for Measuring the Thickness of and Coverage Ratio by the Shell Layer The presence/absence of the shell layer on the toner particle and the thickness of and coverage ratio by the shell layer are measured using the cross-sectional image of the toner as provided by observation with a transmission electron microscope. The toner cross section according to observation with a transmission electron microscope is prepared as follows. The procedure for preparing the ruthenium-stained toner cross section is described in the following. The toner is first broadcast into a single layer on a cover glass (square cover glass, Square No. 1, Matsunami Glass Ind., Ltd.). An Os film (5 nm) and a naphthalene film (20 nm) are then executed thereon as protective films using an Osmium Plasma Coater (OPC80T, Filgen, Inc.).

D800 photocurable resin (JEOL Ltd.) is then filled into a PTFE tube (1.5 mm φ inner diameter×3 mm φ outer diameter×3 mm), and the aforementioned cover glass is gently placed on the tube with the toner facing so as to come into contact with the D800 photocurable resin. This assembly is exposed to light and the resin is cured, followed by removal of the cover glass and tube to produce a resin cylinder in which the toner is embedded in the surfacemost side.

Using an ultrasound ultramicrotome (UC7, Leica), cross sections of the center of the toner are generated by slicing at just the length of the radius of the toner (for example, 3.5 μm when the weight-average particle diameter (D4) is 7.0 μm) from the surfacemost side of the resin cylinder at a slicing rate of 0.6 mm/s. Thin-section samples of the toner cross section are then prepared by slicing at a film thickness of 100 nm. Cross sections of the center of the toner can be obtained by sectioning in accordance with this procedure. The resulting thin-section samples are stained for 15 minutes in a 500 Pa ruthenium tetroxide ($RuO_4$) gas atmosphere using a vacuum electron staining apparatus (VSC4R1H. Filgen, Inc.). A transmission electron microscope (TEM) (JEM 2800, JEOL Ltd.) is used to obtain the TEM image of the toner at an acceleration voltage condition of 200 kV.

Image acquisition is performed using a TEM probe size of 1 nm and an image size of 1024×1024 pixels. The core and shell layer of the toner particle are observed as different contrasts in the TEM image. The light/dark difference varies depending on the material, and the shell layer is taken to be the region observed as a region with a different contrast from the core.

The shell layer thickness is measured as follows using ImageJ image analysis software (available at https://imagej.nih.gov/ij/).

Using the TEM images of 10 randomly selected toners, the toner cross section for each toner is evenly divided into sixteenths using as the center the point of intersection between the long axis L of the toner cross section and the perpendicular axis L90 that passes through the center of the long axis L. The distance is measured from the surface of the core to the surface of the shell layer on the 16 straight lines running from the center to the toner surface. The arithmetic average value of all the measurement values for the 10 toner cross sections is taken to be the thickness of the shell layer.

The method for measuring the coverage ratio of the core particle by the shell layer will now be described. The coverage ratio of the core particle by the shell layer is measured from the cross-sectional observations during measurement of the shell layer thickness. The length (L) of the perimeter of the core is first determined. The length (Ls) of the region where the shell layer is present on the core surface is measured and the coverage ratio by the shell layer of the toner is calculated using the following formula. The arithmetic average value calculated for this coverage ratio over the TEM images of the 10 toner cross sections is used as the coverage ratio by the shell layer.

$$\text{coverage ratio by the shell layer of the core particle } (\%)=(Ls)/(L)\times 100$$

Method for Measuring the Attachment Index of the Organosilicon Polymer Particles An evaluation of the amount of transfer of the organosilicon polymer particles when the toner is brought into contact with a substrate is used as the procedure for expressing the state of attachment of the organosilicon polymer particles with an index. With regard to the material of the surface layer of the substrate, a substrate that uses a polycarbonate resin for the surface layer material is used as a substrate that simulates the surface layer of the photosensitive member. Specifically, a coating solution is first prepared by dissolving a bisphenol Z-type polycarbonate resin (product name: Iupilon Z-400. Mitsubishi Engineering-Plastics Corporation, viscosity-average molecular weight (Mv) =40000) in toluene to a concentration of 10 mass %. Using a #50 Mayer bar, this coating solution is coated on a 50 μm-thick aluminum sheet to form a coating film. This coating film is dried for 10 minutes at 100° C. to produce a sheet having a polycarbonate resin layer (film thickness=10 μm) on the aluminum sheet. This sheet is supported with a substrate holder. The substrate is a square with 3 mm edges. The measurement step is subdivided into a step of placing the toner on the substrate, a step of removing the toner from the substrate, and a step of quantitating the amount of attachment of the organosilicon polymer particles that have been supplied to the substrate, each of which is described in the following.

Step of Placing the Toner on the Substrate

The toner is introduced into a soft, porous material (denoted below as the "toner carrier"), and this toner carrier is brought into contact with the substrate. The method for impregnating the toner into the toner carrier comprises carrying out the following step five times: dipping the toner carrier into a container filled with sufficient toner and then removing the toner carrier. The surface of the toner carrier is visually confirmed to be coated with the toner and not visible. A sponge (product name: White Wiper, Marusan Industry Co., Ltd.) is used for the toner carrier. The toner-loaded toner carrier is fixed to the end of a load cell that itself is fixed to a stage that moves in the perpendicular direction with respect to the contact surface of the substrate, whereby the toner-loaded toner carrier and substrate can be brought into contact while measuring the load. Designating one step as moving the stage to press the toner-loaded toner carrier against the substrate until the load cell displays 10 N and then separating, contact between the toner-loaded toner carrier and substrate is performed by carrying out this step five times.

Step of Removing the Toner from the Substrate

After contact with the toner-loaded toner carrier, an elastomeric suction opening with an inner diameter of approximately S mm, which is connected to the nozzle end of a vacuum cleaner, is brought into proximity to the substrate so as to be perpendicular to the toner placement side and the toner adhered on the substrate is removed. This removal is carried out while visually ascertaining the degree to which the toner remains. The distance between the substrate and the end of the suction opening is 1 mm, and the duration of suction is 3 seconds and the suction pressure is 6 kPa.

Step of Quantitating the Amount of Attachment of the Organosilicon Polymer Particles that have been Supplied to the Substrate Image measurement during observation with a scanning electron microscope is used to quantitate the amount and shape of the organosilicon polymer particles that remain on the substrate after removal of the toner. First, after removal of the toner, platinum is sputtered on the substrate using conditions of a current of 20 mA and 60 seconds to prepare a specimen for observation. Any observation magnification that enables observation of the organosilicon polymer particles may be selected for the observation with the scanning electron microscope. A Hitachi Ultrahigh Resolution Field Emission Scanning Electron Microscope (product name: S-4800, Hitachi High-Technologies Corporation) is used for the scanning electron microscope, and observation with the S-4800 (product name) is carried out using the backscattered electron image. 50000× is used for the observation magnification, 10 kV is used for the acceleration voltage, and 3 mm is used for the working distance.

In the image yielded by the observation, the organosilicon polymer particles are displayed at high brightness and the substrate is displayed at low brightness, and because of this the amount of the organosilicon polymer particles in a visual field can be quantitated by binarization. The binarization conditions are selected as appropriate in accordance with the observation instrument and the sputtering conditions. ImageJ image analysis software (available at https://imagej.nih.gov/ij/) is used for the binarization. Only the area of the organosilicon polymer particles is summed with the ImageJ, and the area ratio for the organosilicon polymer particles in the observed visual field is determined by dividing by the area of the overall observed visual field. This measurement is carried out on 100 binarized images, and the average value thereof is used as the area ratio [A] (unit: area %) for the organosilicon polymer particles on the substrate.

The coverage ratio [B] (unit: area %) by the organosilicon polymer particles on the toner particle is then calculated. The coverage ratio by the organosilicon polymer particles is measured using image measurement in observation with a scanning electron microscope. The same magnification as in the observation of the organosilicon polymer particles on the substrate is adopted for the observation magnification used to observe the organosilicon polymer particles in the observation with the scanning electron microscope. The aforementioned S-4800 Hitachi Ultrahigh Resolution Field Emission Scanning Electron Microscope (product name) is used for the scanning electron microscope. When, in the measurement of the area ratio A and the coverage ratio B, fine particles other than the organosilicon polymer particles are present in the toner, EDS analysis is performed on each of the external additive particles during toner observation, and whether the analyzed particle is an organosilicon polymer particle is scored based on the presence/absence of Si element peaks. In specific terms, the same procedure is carried out as for the number-average primary particle diameter of the organosilicon polymer particles.

The conditions for image acquisition are as follows.

(1) Sample Production

A conductive paste is thinly applied onto a sample stand (15 mm×6 mm aluminum sample stand), and toner is blown onto the paste. Air is further blown to remove excess toner from the sample stand, and thoroughly dry the toner. The sample stand is set in a sample holder, and the height of the sample stand is adjusted to 36 mm using a sample height gauge.

(2) Setting of S-4800 Observation Conditions

The coverage ratio [B] of the organosilicon polymer particles is calculated using images obtained through backscattered electron image observation in S-4800. The coverage ratio [B] of the organosilicon polymer particles can be measured with good precision because charge-up is less pronounced in backscattered electron images than in secondary electron images.

Liquid nitrogen is poured into an anti-contamination trap attached to the housing of S-4800, until overflow, and the whole is allowed to stand for 30 minutes. Then "PC-SEM" of S-4800 is operated, to perform flushing (to purify a FE chip as an electron source). An acceleration voltage display portion of the control panel on the screen is clicked, and the [Flushing] button is pressed, to open a flushing execution dialog. Flushing is executed after the flushing strength is confirmed to be 2. It is then checked that an emission current by flushing is from 20 μA to 40 μA. The sample holder is inserted into a sample chamber of the S-4800 housing. Then [Origin] is pressed on the control panel, to transfer the sample holder to the observation position.

The acceleration voltage display portion is clicked to open an HV setting dialog, and acceleration voltage is set to [0.8 kV] and emission current to [20 μA]. In a [Basic] tab of the operation panel, signal selection is set to [SE], [Upper (U)] and [+BSE] are selected as an SE detector, and [L.A. 100] is selected using the selection button to the right of [+BSE], to set a mode of observation on a backscattered electron image.

In the same [Basic] tab of the operation panel, the probe current of a condition block of an electro-optical system is set to [Normal], focus mode to [UHR], and WD to [3.0 mm]. The [ON] button of the acceleration voltage display portion on the control panel is pressed, to apply acceleration voltage.

(3) Focus Adjustment

The magnification indicator in the control panel is dragged to set magnificatons to 5000 (5 k) magnifications. The [COARSE] focus knob on the operation panel is turned, and the aperture alignment is adjusted once a certain focus is achieved throughout the field of view. Then, [Align] is clicked on the control panel, to display an alignment dialog, and [Beam] is selected. The STIGMA/ALIGNMENT knobs (X, Y) on the operation panel are turned, and the displayed beam is moved to the center of the concentric circle. Then [Aperture] is selected, and the STIGMA/ALIGNMENT knobs (X, Y) are turned one at a time, until image movement ceases or is minimal. The aperture dialog is closed, and focusing is performed using autofocus. This operation is then repeated twice to adjust focus.

In a state where the midpoint of maximum diameter is aligned with the center of the measurement screen, for the target toner, the magnification indicator in the control panel is dragged to set magnifications to 10000 (10 k) magnifications. The [COARSE] focus knob on the operation panel is turned, and aperture alignment is adjusted once a certain focus is achieved. Then, [Align] is clicked on the control panel to display an alignment dialog, and [Beam] is selected. The STIGMA/ALIGNMENT knobs (X, Y) on the operation panel are turned, and the displayed beam is moved to the center of the concentric circle.

Then, [Aperture] is selected, and the STIGMA/ALIGNMENT knobs (X, Y) are turned one at a time until image movement ceases or is minimal. The aperture dialog is closed, and focusing is performed using autofocus. Thereafter, magnifications are set to 50000 (50 k) magnifications, focus is adjusted using the focus knob and STIGMA/ALIGNMENT knobs as described above, and focusing is performed once more using autofocus. This operation is repeated again to adjust focus. When the inclination angle of an observation surface is large, the measurement precision of coverage ratio is prone to decrease. To perform the analysis, therefore, an observation surface exhibiting as little inclination as possible is selected by choosing the observation surface so that the entirety thereof becomes focused simultaneously.

(4) Image Storage

Brightness is adjusted in an ABC mode, and 640×480 pixel photographs are captured and stored. The analysis described below is performed using these image files. One photograph is captured for each toner, to obtain images of at least 100 particles of toner.

The observed image is binarized using ImageJ image analysis software (available at https://imagej.nih.gov/ij/). After binarization, via [Analyze]-[Analyze Particles], only the organosilicon polymer particles are extracted based on the EDS analysis and the coverage ratio (unit: area %) by the organosilicon polymer particles on the toner particle is determined. This measurement is carried out on 100 binarized images and the average value of the coverage ratio (unit: area %) by the organosilicon polymer particles is used as the coverage ratio [B] by the organosilicon polymer particles. The attachment index for the organosilicon polymer particles is calculated using the following formula (1) from the area ratio [A] for the organosilicon polymer particles on the substrate and the coverage ratio [B] by the organosilicon polymer particles.

attachment index=area ratio [$A$] for the organosilicon polymer particles transferred to the polycarbonate film/coverage ratio [$B$] by the organosilicon polymer particles at the toner particle surface× 100 (I)

Method for Measuring the Dispersity Evaluation Index of the Organosilicon Polymer Particles The dispersity evaluation index for the organosilicon polymer particles at the toner surface is determined using an "S-4800" scanning electron microscope. In a visual field enlarged by 10000×, observation at an acceleration voltage of 1.0 kV is performed in the same visual field of the toner to which organosilicon polymer particles have been externally added. The determination is carried out on the observed image as described in the following using "Image-Pro Plus 5.1J" (Media Cybernetics. Inc.) image processing software.

Binarization is performed such that only organosilicon polymer particles are extracted; the number n of the organosilicon polymer particles and the barycentric coordinates for all the organosilicon polymer particles are determined; and the distance dn min to the nearest-neighbor organosilicon polymer particle is determined for each organosilicon polymer particle. The dispersity is given by the following formula using dave for the average value of the nearest-neighbor distances between the organosilicon polymer particles in the image.

The dispersity is determined using this procedure on 50 of the toner observed at random, and the arithmetic average value thereof is taken to be the dispersity evaluation index. Smaller values of the dispersity evaluation index indicate a better dispersity. When fine particles other than the organosilicon polymer particles are present in the toner, the organosilicon polymer particles can be differentiated by the EDS analysis referenced above.

$$\text{dispersity evaluation index} = \sqrt{\frac{\sum_1^n (dn\min - dave)^2}{n}} \Big/ dave$$

Method for Measuring the Weight-Average Particle Diameter (D4) of the Toner

The weight-average particle diameter (D4) of the toner is determined proceeding as follows. The measurement instrument used is a "Coulter Counter Multisizer 3" (registered trademark, Beckman Coulter, Inc.), a precision particle size distribution measurement instrument operating on the pore electrical resistance method and equipped with a 100-μm aperture tube. The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels. The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used.

The dedicated software is configured as follows prior to measurement and analysis. In the "modify the standard operating method (SOMME)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the "threshold value/noise level measurement button". In addition, the current is set to 1600 μA; the gain is set to 2; the electrolyte solution is set to ISOTON U; and a check is entered for the "post-measurement aperture tube flush". In the "setting conversion from pulses to particle diameter" screen of the dedicated software, the bin interval is set to logarithmic particle diameter; the particle diameter bin is set to 256 particle diameter bins; and the particle diameter range is set to 2 μm to 60 μm. The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30 mL of the aqueous electrolyte solution is introduced into a 100-mL flatbottom glass beaker, and to this is added as dispersing agent approximately 0.3 mL of a dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetra 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180'. Approximately 3.3 L of deionized water is introduced into the water tank of the ultrasound disperser and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner is added to the aqueous electrolyte solution in small aliquots and dispersion is carried out. The ultrasound dispersion treatment is continued for an additional 60 seconds. The water temperature in the water tank is controlled as appropriate during ultrasound dispersion to be 10° C. to 40° C.

(6) Using a pipette, the dispersed toner-containing aqueous electrolyte solution prepared in (5) is dripped into the roundbottom beaker set in the sample stand as described in (1) with adjustment to provide a measurement concentration of 5%. Measurement is then performed until the number of measured particles reaches 50,000.

(7) The measurement data is analyzed by the dedicated software provided with the instrument and the weight-average particle diameter (D4) is calculated. When set to graph/volume % with the dedicated software, the "average diameter" on the "analysis/volumetric statistical value (arithmetic average)" screen is the weight-average particle diameter (D4).

EXAMPLES

The present invention is described in greater detail in the following using examples and comparative examples, but the present invention is in no way limited thereto or thereby. The parts used in the examples is on a mass basis unless specifically indicated otherwise.

Organosilicon Polymer Particle 1 Production Example

First Step 360 parts of water was introduced into a reaction vessel fitted with a thermometer and a stirrer, and 13 parts of hydrochloric acid having a concentration of 5.0 mass % was added to provide a uniform solution. While stirring this at a temperature of 25° C., 122 parts of methyltrimethoxysilane and 15 parts of tetramethoxysilane were added, stirring was performed for 5 hours, and filtration was then carried out to obtain a transparent reaction solution containing a silanol compound and partial condensate thereof.

Second Step 440 parts of water was introduced into a reaction vessel fitted with a thermometer, stirrer, and dropwise addition device and 17 parts of aqueous ammonia having a concentration of 10.0 mass % was added to provide a uniform solution. While stirring this at a temperature of 35° C., 100 parts of the reaction solution obtained in the first step was added dropwise over 0.50 hours, and stirring was performed for 6 hours to obtain a suspension. The resulting suspension was processed with a centrifugal separator and the fine particles were sedimented and withdrawn and were dried for 24 hours with a dryer at a temperature of 200° C. to obtain organosilicon polymer particle 1. The obtained organosilicon polymer particle 1 had a number-average primary particle diameter of 100 nm, an area ratio for the T3 unit structure of 0.89, and an $SP_{Si}$ of 9.02.

Organosilicon Polymer Particles 2 to 9 Production Example

Organosilicon polymer particles 2 to 9 were obtained proceeding as in the Organosilicon Polymer Particle 1 Production Example, but changing the silane compound and production conditions as indicated in Tables 1-1 and 1-2. The properties of the resulting organosilicon polymer particles 2 to 9 are given in Tables 1-1 and 1-2.

TABLE 1-1

| Organo-silicon polymer | First step | | | | | | | | |
|---|---|---|---|---|---|---|---|---|---|
| | water | hydrochloric acid | reaction temperature | silane compound A | | silane compound B | | silane compound C | |
| particle No. | parts | parts | ° C. | name | parts | name | parts | name | parts |
| 1 | 360 | 13 | 25 | methyltrimethoxysilane | 122 | tetramethoxysilane | 15 | | |
| 2 | 360 | 13 | 25 | methyltrimethoxysilane | 122 | tetramethoxysilane | 15 | | |
| 3 | 360 | 13 | 25 | methyltrimethoxysilane | 122 | tetramethoxysilane | 15 | | |
| 4 | 360 | 13 | 25 | methyltrimethoxysilane | 129 | dimethyldimethoxysilane | 6 | | |
| 5 | 360 | 13 | 25 | methyltrimethoxysilane | 88 | dimethyldimethoxysilane | 30 | trimethylmonomethoxysilane | 10 |
| 6 | 360 | 13 | 25 | methyltrimethoxysilane | 68 | dimethyldimethoxysilane | 48 | trimethylmonomethoxysilane | 10 |
| 7 | 360 | 13 | 25 | methyltrimethoxysilane | 61 | dimethyldimethoxysilane | 54 | trimethylmonomethoxysilane | 10 |
| 8 | 360 | 13 | 25 | methyltrimethoxysilane | 43 | dimethyldimethoxysilane | 84 | trimethylmonomethoxysilane | 15 |
| 9 | 360 | 13 | 25 | methyltrimethoxysilane | 122 | tetramethoxysilane | 15 | | |

TABLE 1-2

| | Second step | | | | | Number- | Area | |
|---|---|---|---|---|---|---|---|---|
| Organosilicon polymer particle No. | reaction solution provided by the first step parts | water parts | aqueous ammonia parts | temperature at start of reaction ° C. | time of dropwise addition h | average particle diameter nm | proportion for the T3 unit structure | SP value (SPsi) |
| 1 | 100 | 440 | 17 | 35 | 0.50 | 100 | 0.89 | 9.02 |
| 2 | 100 | 440 | 20 | 35 | 3.00 | 15 | 0.85 | 9.02 |
| 3 | 100 | 440 | 20 | 35 | 0.23 | 320 | 0.91 | 9.02 |
| 4 | 100 | 440 | 18 | 35 | 0.40 | 100 | 0.88 | 8.62 |
| 5 | 100 | 440 | 18 | 35 | 0.45 | 100 | 0.64 | 8.18 |
| 6 | 100 | 440 | 18 | 35 | 0.50 | 100 | 0.51 | 7.98 |

TABLE 1-2-continued

| Organosilicon polymer particle No. | Second step: reaction solution provided by the first step parts | water parts | aqueous ammonia parts | temperature at start of reaction ° C. | time of dropwise addition h | Number-average particle diameter nm | Area proportion for the T3 unit structure | SP value (SPsi) |
|---|---|---|---|---|---|---|---|---|
| 7 | 100 | 440 | 18 | 35 | 0.50 | 100 | 0.46 | 7.91 |
| 8 | 100 | 440 | 18 | 35 | 0.35 | 160 | 0.35 | 7.70 |
| 9 | 100 | 440 | 20 | 35 | 0.18 | 530 | 0.92 | 9.02 |

Resin Particle 1

Resin particles with the following properties were prepared for the resin particle 1 used as an external additive.

styrene-2-ethylhexyl acrylate-methyl methacrylate-ethylene dimethacrylate copolymer number-average primary particle diameter: 100 nm Tg: 105° C.

proportion of peak area originating with silicon having the T3 unit structure: 0%

Large Diameter Silica 1

Silica with the following properties was prepared for the large diameter silica 1 used as an external additive.

silica fine particles prepared by the sol-gel method number-average primary particle diameter: 100 nm proportion of peak area originating with silicon having the T3 unit structure: 0%

Shell Thermoplastic Resin 1 Production Example 77.1 parts of styrene. 36.9 parts of 2-ethylhexyl acrylate, 5.5 parts of methyl methacrylate, and 1.0 parts of ethylene glycol dimethacrylate were added to and dispersed into an aqueous solution of 3.0 parts of the dispersing agent (surfactant) Neogen RK (Dai-ichi Kogyo Seiyaku Co., Ltd.) dissolved in 50 parts of deionized water. An aqueous solution of 0.3 parts of potassium persulfate dissolved in 10 parts of deionized water was also added while gently stirring for 10 minutes. After nitrogen substitution had been carried out, an emulsion polymerization was run for 6 hours at 70° C. After the completion of polymerization, the reaction solution was cooled to room temperature and deionized water was added to yield an aqueous dispersion of shell thermoplastic resin 1 having a solids concentration of 50 mass % and a median diameter on a volume basis of 60 nm. Thermoplastic resin 1 had a number-average primary particle diameter of 65 nm, a peak top molecular weight of 218000, a Tg of 65° C., and an $SP_{Sb}$ value of 9.72.

Shell Thermoplastic Resins 2 to 12 Production Example

Shell thermoplastic resins 2 to 12 were obtained proceeding as in the Shell Thermoplastic Resin 1 Production Example, but changing the monomer composition and the amount of Neogen RK surfactant as indicated in Table 2. The properties of the resulting shell thermoplastic resins 2 to 12 are given in Table 2.

TABLE 2

| Thermoplastic resin No. | Monomer: styrene parts | butyl acrylale parts | 2-ethylhexyl acrylate parts | methyl methacrylate parts | ethylene glycol dimethacrylate parts | Dispersing agent parts | Number-average particle diameter nm | Solids concentration mass % | Peak top molecular weight ×10000 | Tg ° C. | SP value (SPsh) |
|---|---|---|---|---|---|---|---|---|---|---|---|
| 1 | 77.1 | — | 36.9 | 5.5 | 1.0 | 3.0 | 65 | 50 | 21.8 | 65 | 9.72 |
| 2 | 62.5 | — | 72.4 | — | 1.4 | 3.0 | 64 | 50 | 21.5 | 66 | 9.60 |
| 3 | 77.1 | 12.8 | 18.4 | 5.8 | 0.4 | 3.0 | 68 | 50 | 3.4 | 54 | 9.77 |
| 4 | 77.1 | — | 36.9 | 5.0 | 2.0 | 3.0 | 63 | 50 | 48.5 | 72 | 9.73 |
| 5 | 77.1 | — | 36.9 | 5.5 | 1.0 | 2.0 | 100 | 50 | 21.3 | 63 | 9.72 |
| 6 | 77.1 | — | 36.9 | 5.5 | 1.0 | 1.0 | 300 | 50 | 22.3 | 67 | 9.72 |
| 7 | 77.1 | — | 36.9 | 5.5 | 1.0 | 0.8 | 350 | 50 | 21.6 | 66 | 9.72 |
| 8 | 56.2 | 25.6 | 36.9 | 5.8 | 0.4 | 3.0 | 65 | 50 | 19.3 | 45 | 9.71 |
| 9 | 45.8 | 38.5 | 36.9 | 5.8 | 0.4 | 3.0 | 70 | 50 | 17.5 | 38 | 9.71 |
| 10 | 85.4 | — | 18.4 | 7.8 | 0.4 | 3.0 | 68 | 50 | 30.8 | 78 | 9.77 |
| 11 | — | — | — | 100 | — | 3.0 | 66 | 50 | 2.5 | 81 | 9.93 |
| 12 | 77.1 | — | 36.9 | 4.5 | 3 | 3.0 | 66 | 50 | 53.0 | 74 | 9.73 |
| 13 | refer to Specification | | | | | | 66 | 50 | 0.8 | 65 | 10.10 |

Shell Thermoplastic Resin 13 Production Example

Terephthalic acid: 30 mol parts

Fumaric acid: 70 mol parts

Polyoxypropylene(2.2)-2,2-bis(4-hydroxyphenyl)propane: 95 mol parts

Polyoxyethylene(2.2)-2,2-bis(4-hydroxyphenyl)propane: 5 mol parts

These materials were introduced into a glass 2-liter four-neck flask; a thermometer, stainless steel stirring rod, down-flow condenser, and nitrogen introduction line were installed; and a polyester resin 13 was obtained by reacting in a mantle heater for 22 hours at 230° C. under a nitrogen current.

Polyester resin 13: 100.0 parts

Nonionic surfactant (Noigen XL-160, Dai-ichi Kogyo Seiyaku Co., Ltd., cloud point=98'C): 2.0 parts Dimethylaminoethanol (Kishida Chemical Co., Ltd.): 7.5 parts The materials indicated above were introduced into a 500-ml, beaker and were mixed for 120 minutes at 95.0° C. while stirring at 200 r/min using a stirrer. Then, while maintaining the temperature. 200.0 parts of deionized water heated to 95.0° C. was added dropwise over 2 hours while stirring at 200 r/min using a stirrer, thus yielding an aqueous dispersion 1 of thermoplastic resin 13. The obtained dispersion was passed through a metal mesh having an aperture of 105 μm to remove the coarse particle component, thus yielding an aqueous dispersion of shell thermoplastic resin 13. The solids concentration was brought to 50 mass % by the addition of deionized water. The properties of shell thermoplastic resin 13 are given in Table 2.

Polyester Resin Composition 1 Production Example

Bisphenol A/propylene oxide adduct (2.2 mol addition) 95.0 mol parts

Bisphenol A/ethylene oxide adduct (2.2 mol addition) 10.0 mol parts

Terephthalic acid 90.0 mol parts

Adipic acid 5.0 mol parts

The polyester monomer mixture indicated above was introduced into a 5-liter autoclave along with dibutyltin oxide at 0.2 mass % with reference to the overall amount of the monomer, and a reflux condenser, water separation apparatus, $N_2$ gas introduction line, thermometer, and stirring device were installed. A polycondensation reaction was run at 230° C. while introducing $N_2$ gas into the autoclave. The reaction time was adjusted so as to provide the desired Tg; after the completion of the reaction, removal from the vessel, cooling, and pulverization yielded the polyester resin composition 1. Polyester resin composition 1 had a Tg of 49° C.

Toner Particle 1 Production Example

The Toner Particle 1 Production Example is described in the following.

Core Particle 1 Production Example

Polyester resin composition 1: 100 parts

C.I. Pigment Blue 15:3 (copper phthalocyanine): 5 parts

Ester wax (behenyl behenate; melting point: 72° C.): 15 parts

Fischer-Tropsch wax (C105, Sasol Limited, melting point: 105° C.): 2 parts

These materials were preliminarily mixed using a Mitsui Henschel mixer (Mitsui Miike Chemical Engineering Machinery Co., Ltd.), followed by melt-kneading using a twin-screw extruder (product name: PCM-30, Ikegai Ironworks Corporation) with the temperature set to provide a temperature for the melted material at the outlet of 140° C. The resulting kneaded material was cooled and coarsely pulverized using a hammer mill and was then pulverized using a pulverizer (product name: Turbo Mill T250, Turbo Kogyo Co., Ltd.). The resulting finely pulverized powder was classified using a Coanda effect-based multi-grade classifier to yield a core particle 1 having a weight-average particle diameter (1D4) of 6.8 μm and a Tg of 48° C.

Toner Particle 1 Production Example

A reactor holding 300.0 parts of deionized water was held at 30° C., after which dilute hydrochloric acid was added to adjust the pH of the aqueous medium to 4.0. After the pH had been adjusted, 100.0 parts of the obtained core particle 1 was introduced to prepare a slurry of core particle 1. This was followed by the addition of 2.0 parts of the aqueous dispersion of shell thermoplastic resin 1 having a solids concentration of 50 mass %, in order to add 1.0 parts of the shell thermoplastic resin 1 per 100.0 parts of the core particle 1, and a shell layer was then formed on the core particle surface by raising the temperature to 75° C. and holding for 2 hours. After cooling to room temperature, filtration, washing with water, and drying then gave a toner particle 1 having a core-shell structure and having a weight-average particle diameter (D4) of 6.8 μm.

Toner 1 Production Example

Organosilicon polymer particle 1 and hydrophobic silica fine particles were added to toner particle 1 using an FM mixer (Model FM10C, Nippon Coke & Engineering Co., Ltd.). With the water temperature in the jacket of the FM mixer having been stabilized at 25° C.=1° C., 1.5 parts of organosilicon polymer particle 1 and 0.8 parts of hydrophobic silica fine particles (treated with hexamethyldisilazane, BET 200 $m^2/g$) were introduced per 100 parts of toner particle 1. Mixing at a peripheral velocity for the rotating blades of 28 m/sec was begun; mixing was carried out for 4 minutes while controlling the water temperature and flow rate within the jacket so as to have the temperature within the tank be stable at 25° C.±1° C.; and screening across a mesh with an aperture of 75 μm then gave toner 1. The toner particle used to produce toner 1, the core, the type and amount of addition of the shell thermoplastic resin, the mixing conditions for external addition, and the content in the toner of the organosilicon polymer particles are given in Table 3. Table 4 gives the ΔSP value provided by analysis of toner 1, the thickness of and coverage ratio by the shell, and the attachment index and dispersity evaluation index for the organosilicon polymer particles. The properties for the analyzed organosilicon polymer particles from toner 1 were the same as the values given in Tables 1-1 and 1-2.

TABLE 3

| Toner | Toner particle | Core particle | | Amount of shell addition | | | External addition step: external additive | | External addition step: hydrophobic silica | External addition step: mixing | CT |
|---|---|---|---|---|---|---|---|---|---|---|---|
| No. | No. | No. | Shell layer | parts | SPsh | Spsi | type | parts | parts | conditions | mass % |
| 1 | 1 | 1 | thermoplastic resin 1 | 1.0 | 9.72 | 9.02 | organosilicon polymer particle 1 | 1.5 | 0.8 | 28 m/sec × 4 minutes | 1.47 |
| 2 | 1 | 1 | thermoplastic resin 1 | 1.0 | 9.72 | 9.02 | organosilicon polymer particle 2 | 0.4 | 0.8 | 28 m/sec × 4 minutes | 0.40 |
| 3 | 1 | 1 | thermoplastic resin 1 | 1.0 | 9.72 | 9.02 | organosilicon polymer particle 3 | 4.8 | 0.8 | 28 m/sec × 4 minutes | 4.55 |
| 4 | 1 | 1 | thermoplastic resin 1 | 1.0 | 9.72 | 8.62 | organosilicon polymer particle 4 | 1.5 | 0.8 | 28 m/sec × 4 minutes | 1.47 |

TABLE 3-continued

| Toner No. | Toner particle No. | Core particle No. | Shell layer | Amount of shell addition parts | SPsh | Spsi | External addition step: external additive type | External addition step: external additive parts | External addition step: hydrophobic silica parts | External addition step: mixing conditions | CT mass % |
|---|---|---|---|---|---|---|---|---|---|---|---|
| 5 | 2 | 1 | thermoplastic resin 2 | 1.0 | 9.60 | 8.18 | organosilicon polymer particle 5 | 1.5 | 0.8 | 28 m/sec × 4 minutes | 1.47 |
| 6 | 3 | 1 | thermoplastic resin 3 | 1.0 | 9.77 | 9.02 | organosilicon polymer particle 1 | 1.5 | 0.8 | 28 m/sec × 4 minutes | 1.47 |
| 7 | 4 | 1 | thermoplastic resin 4 | 1.0 | 9.73 | 9.02 | organosilicon polymer particle 1 | 1.5 | 0.8 | 28 m/sec × 4 minutes | 1.47 |
| 8 | 1 | 1 | thermoplastic resin 1 | 1.0 | 9.72 | 9.02 | organosilicon polymer particle 1 | 1.5 | 0.8 | 28 m/sec × 8 minutes | 1.47 |
| 9 | 1 | 1 | thermoplastic resin 1 | 1.0 | 9.72 | 9.02 | organosilicon polymer particle 1 | 1.5 | 0.8 | 28 m/sec × 2 minutes | 1.47 |
| 10 | 1 | 1 | thermoplastic resin 1 | 1.0 | 9.72 | 9.02 | organosilicon polymer particle 1 | 0.4 | 0.8 | 28 m/sec × 4 minutes | 0.40 |
| 11 | 1 | 1 | thermoplastic resin 1 | 1.0 | 9.72 | 9.02 | organosilicon polymer particle 1 | 10.0 | 0.8 | 28 m/sec × 4 minutes | 9.03 |
| 12 | 1 | 1 | thermoplastic resin 1 | 1.0 | 9.72 | 9.02 | organosilicon polymer particle 1 | 0.3 | 0.8 | 28 m/sec × 4 minutes | 0.25 |
| 13 | 1 | 1 | thermoplastic resin 1 | 1.0 | 9.72 | 9.02 | organosilicon polymer particle 1 | 11.0 | 0.8 | 28 m/sec × 4 minutes | 9.84 |
| 14 | 5 | 1 | thermoplastic resin 1 | 0.4 | 9.72 | 9.02 | organosilicon polymer particle 1 | 1.5 | 0.8 | 28 m/sec × 4 minutes | 1.47 |
| 15 | 6 | 1 | thermoplastic resin 1 | 0.3 | 9.72 | 9.02 | organosilicon polymer particle 1 | 1.5 | 0.8 | 28 m/sec × 4 minutes | 1.47 |
| 16 | 7 | 1 | thermoplastic resin 5 | 1.3 | 9.72 | 9.02 | organosilicon polymer particle 1 | 1.5 | 0.8 | 28 m/sec × 4 minutes | 1.47 |
| 17 | 8 | 1 | thermoplastic resin 6 | 4.5 | 9.80 | 9.02 | organosilicon polymer particle 1 | 1.5 | 0.8 | 28 m/sec × 4 minutes | 1.47 |
| 18 | 9 | 1 | thermoplastic resin 7 | 5.0 | 9.80 | 9.02 | organosilicon polymer particle 1 | 1.5 | 0.8 | 28 m/sec × 4 minutes | 1.47 |
| 18 | 10 | 1 | thermoplastic resin 8 | 1.0 | 9.71 | 9.02 | organosilicon polymer particle 1 | 1.5 | 0.8 | 28 m/sec × 4 minutes | 1.47 |
| 20 | 11 | 1 | thermoplastic resin 9 | 1.0 | 9.71 | 9.02 | organosilicon polymer particle 1 | 1.5 | 0.8 | 28 m/sec × 4 minutes | 1.47 |
| 21 | 12 | 1 | thermoplastic resin 10 | 1.0 | 9.77 | 9.02 | organosilicon polymer particle 1 | 1.5 | 0.8 | 28 m/sec × 4 minutes | 1.47 |
| 22 | 1 | 1 | thermoplastic resin 1 | 1.0 | 9.72 | 7.98 | organosilicon polymer particle 6 | 1.5 | 0.8 | 28 m/sec × 4 minutes | 1.47 |
| 23 | 1 | 1 | thermoplastic resin 1 | 1.0 | 9.72 | 7.91 | organosilicon polymer particle 7 | 1.5 | 0.8 | 28 m/sec × 4 minutes | 1.47 |
| C. 1 | 1 | 1 | thermoplastic resin 1 | 1.0 | 9.72 | — | resin particle 1 | 1.2 | 0.8 | 28 m/sec × 4 minutes | 1.18 (resin particle 1) |
| C. 2 | 13 | 1 | thermoplastic resin 11 | 1.0 | 9.93 | 9.02 | organosilicon polymer particle 1 | 1.5 | 0.8 | 28 m/sec × 4 minutes | 1.47 |
| C. 3 | 14 | 1 | thermoplastic resin 12 | 1.0 | 9.73 | 9.02 | organosilicon polymer particle 1 | 1.5 | 0.8 | 28 m/sec × 4 minutes | 1.47 |
| C. 4 | 15 | 1 | thermoplastic resin 13 | 1.0 | 10.10 | 7.70 | organosilicon polymer particle 8 | 1.5 | 0.8 | 28 m/sec × 4 minutes | 1.47 |
| C. 5 | 1 | 1 | thermoplastic resin 1 | 1.0 | 9.72 | 9.02 | organosilicon polymer particle 9 | 7.9 | 0.8 | 28 m/sec × 4 minutes | 7.27 |
| C. 6 | 1 | 1 | thermoplastic resin 1 | 1.0 | 9.72 | — | large diameter silica 1 | 2.3 | 0.8 | 28 m/sec × 4 minutes | 2.23 (large diameter silica) |
| C. 7 | 16 | 1 | — | — | — | 9.02 | organosilicon polymer particle 1 | 1.5 | 0.8 | 28 m/sec × 4 minutes | 1.47 |

In the Tables, "C." denotes "comparative", and "CT." denotes "Content of organosilicon polymer particles in the toner (mass %)".

TABLE 4

| Toner | ΔSP | Shell thickness nm | Shell coverage ratio % | Attachment index | Dispersity evaluation index |
|---|---|---|---|---|---|
| Toner 1 | 0.70 | 22 | 82 | 4.3 | 1.2 |
| Toner 2 | 0.70 | 22 | 82 | 3.7 | 0.9 |
| Toner 3 | 0.70 | 22 | 82 | 5.2 | 2.0 |
| Toner 4 | 1.10 | 22 | 83 | 4.2 | 1.1 |
| Toner 5 | 1.42 | 24 | 81 | 4.3 | 1.2 |
| Toner 6 | 0.75 | 20 | 84 | 4.0 | 0.9 |
| Toner 7 | 0.71 | 23 | 83 | 4.4 | 1.2 |

TABLE 4-continued

| Toner | ΔSP | Shell thickness nm | Shell coverage ratio % | Attachment index | Dispersity evaluation index |
|---|---|---|---|---|---|
| Toner 8 | 0.70 | 22 | 82 | 4.2 | 2.1 |
| Toner 9 | 0.70 | 22 | 81 | 4.8 | 1.6 |
| Toner 10 | 0.70 | 22 | 82 | 3.9 | 1.8 |
| Toner 11 | 0.70 | 22 | 82 | 4.4 | 0.7 |
| Toner 12 | 0.70 | 22 | 82 | 3.8 | 1.9 |
| Toner 13 | 0.70 | 22 | 82 | 4.5 | 0.6 |
| Toner 14 | 0.70 | 18 | 35 | 4.1 | 1.3 |
| Toner 15 | 0.70 | 16 | 28 | 4.2 | 1.2 |
| Toner 16 | 0.70 | 35 | 85 | 4.2 | 1.3 |
| Toner 17 | 0.78 | 195 | 88 | 4.3 | 1.3 |
| Toner 18 | 0.78 | 254 | 89 | 4.4 | 1.2 |

TABLE 4-continued

| Toner | ΔSP | Shell thickness nm | Shell coverage ratio % | Attachment index | Dispersity evaluation index |
|---|---|---|---|---|---|
| Toner 19 | 0.69 | 20 | 80 | 4.3 | 0.9 |
| Toner 20 | 0.69 | 22 | 81 | 4.3 | 0.9 |
| Toner 21 | 0.75 | 21 | 78 | 4.4 | 1.5 |
| Toner 22 | 1.74 | 22 | 82 | 4.3 | 1.3 |
| Toner 23 | 1.81 | 22 | 82 | 4.9 | 1.8 |
| comparative toner 1 | — | 22 | 82 | 4.5 (resin particle 1) | 1.4 (resin particle 1) |
| comparative toner 2 | 0.91 | 23 | 93 | 4.4 | 1.3 |
| comparative toner 3 | 0.71 | 21 | 80 | 4.3 | 1.4 |
| comparative toner 4 | 2.40 | 25 | 81 | 4.4 | 1.3 |
| comparative toner 5 | 0.70 | 22 | 82 | 6.1 | 1.5 |
| comparative toner 6 | — | 22 | 82 | 4.2 (large diameter silica 1) | 1.4 (large diameter silica 1) |
| comparative toner 7 | — | — | — | 4.3 | 1.4 |

Toners 2 to 23 and Comparative Toners 1 to 7 Production Example

Toners 2 to 23 and comparative toners 1 to 7 were obtained proceeding as in the Toner 1 Production Example, but using in the Toner 1 Production Example the core particle, type and amount of addition of the shell thermoplastic resin, type and amount of addition of the external additive, and external addition conditions shown in Table 3. The properties are shown in Table 4. The properties for the analyzed organosilicon polymer particles from toners 2 to 23 and comparative toners 1 to 7 were the same as the values given in Tables 1-1 and 1-2.

Example 1

Toner 1 was loaded into a cartridge for an LBP652C laser beam printer from Canon, Inc. and the following evaluations were performed. The results of the evaluations are given in Table 5.

Evaluation of Durability

The durability was evaluated in a high-temperature, high-humidity environment (temperature of 30.0° C., 80% relative humidity), which is a severe environment with regard to toner deterioration. Using 1 print/l job with a horizontal line pattern having a print percentage of 1%, an image output test of a total of 15,000 prints was carried out using a mode in which the machine was set to temporarily stop between jobs and then start the next job. This was presumed to serve as a long-term durability test. The image density was measured at the 1st print and the 15000th print. A4 color laser copy paper (80 g/m$^2$, Canon, Inc.) was used. A 5 mm×5 mm solid black patch image was output, and the image density was measured as the reflection density using a MacBeth reflection densitometer (MacBeth Corporation) and an SPI filter. Higher numerical values indicate a better developing performance.

A: The image density is at least 1.40.

B: The image density is at least 1.30, but less than 1.40.

C: The image density is at least 1.20, but less than 1.30.

D: The image density is less than 1.20.

Evaluation of Fogging

The fogging was evaluated in a low-temperature, low-humidity environment (temperature of 15° C., 10% relative humidity), which is presumed to facilitate broadening of the charge distribution on the toner and to be more severe with regard to fogging. Using 1 print/1 job with a horizontal line pattern having a print percentage of 1%, the fogging was measured at the 5000th print output using a mode in which the machine was set to temporarily stop between jobs and then start the next job. This was presumed to serve as a long-term durability test. A4 color laser copy paper (80 g/m$^2$, Canon, Inc.) was used. The reflectance (%) of a white background region of the fixed image and the reflectance (%) of the transfer material were measured using a reflectometer (Tokyo Denshoku Co., Ltd.), and their difference was calculated to give the fogging density (%). Lower numerical values indicate a better suppression of fogging.

A: The fogging density (%) is not more than 0.5.

B: The fogging density (%) is from 0.6 to 1.5.

C: The fogging density (%) is from 1.6 to 2.5.

D: The fogging density (%) is at least 2.6.

Evaluation of Low-Temperature Fixability

The low-temperature fixability was evaluated in a normal-temperature, normal-humidity environment (temperature of 25.0° C., 60% relative humidity). A modification was made that enabled the fixation temperature at the fixing apparatus to be freely settable. A halftone image providing an image density from 0.60 to 0.65 was output using Fox River Bond paper (110 g/m$^2$), a rough paper, with adjustment of the temperature at the fixing unit in 2° C. intervals in the range from 140° C. to 200° C. The obtained image was rubbed back-and-forth 5 times using lens-cleaning paper under a load of 4.9 kPa, and the low-temperature fixability was evaluated using the lowest temperature at which the percentage density reduction for the image density pre-versus-post-rubbing became not more than 10%. A lower value for this temperature indicates a better low-temperature fixability.

A: The fixation temperature is not more than 170° C.

B: The fixation temperature is from 172° C. to 180° C.

C: The fixation temperature is from 182° C. to 190° C.

D: The fixation temperature is at least 192° C.

Evaluation of Storability

For the storability, 10 g of the toner was weighed into a 50-mL plastic cup; this was held for 30 days in a temperature- and humidity-controlled chamber at 50° C. and 95% RH; and the blocking behavior was then visually evaluated using the following evaluation criteria.

A: Clumping is completely absent.

B: Lumps are present, but are diminished and broken up when the cup is rotated.

C: Lumps remain even though loosened by rotating the cup.

D: Large lumps are present and are not broken up even when the cup is rotated.

TABLE 5

| Example No. | toner | Image density (high-temperature, high-humidity environment) 1st print | | 15,000th print | | Fogging density % (low-temperature, low-humidity environment) 5,000th print | | Fixation temperature (normal-temperature, normal-humidity environment) | | Storability |
|---|---|---|---|---|---|---|---|---|---|---|
| 1 | 1 | A | 1.47 | A | 1.45 | A | 0.3 | A | 160 | A |
| 2 | 2 | A | 1.47 | A | 1.44 | A | 0.4 | A | 160 | A |
| 3 | 3 | A | 1.46 | B | 1.39 | A | 0.4 | A | 160 | A |
| 4 | 4 | A | 1.46 | A | 1.45 | A | 0.3 | A | 160 | A |
| 5 | 5 | A | 1.46 | A | 1.44 | A | 0.4 | A | 160 | A |
| 6 | 6 | A | 1.45 | A | 1.43 | A | 0.5 | A | 154 | A |
| 7 | 7 | A | 1.48 | A | 1.46 | A | 0.4 | A | 166 | A |
| 8 | 8 | A | 1.47 | A | 1.45 | B | 0.9 | A | 164 | A |
| 9 | 9 | A | 1.45 | B | 1.39 | A | 0.4 | A | 160 | A |
| 10 | 10 | A | 1.48 | A | 1.45 | A | 0.4 | A | 158 | A |
| 11 | 11 | A | 1.48 | A | 1.47 | A | 0.3 | A | 162 | A |
| 12 | 12 | A | 1.47 | B | 1.38 | A | 0.4 | A | 158 | A |
| 13 | 13 | A | 1.47 | A | 1.46 | A | 0.4 | A | 164 | A |
| 14 | 14 | A | 1.47 | A | 1.45 | A | 0.4 | A | 154 | A |
| 15 | 15 | A | 1.46 | B | 1.38 | A | 0.5 | A | 154 | B |
| 16 | 16 | A | 1.47 | A | 1.45 | A | 0.4 | A | 160 | A |
| 17 | 17 | A | 1.47 | A | 1.45 | A | 0.5 | A | 166 | A |
| 18 | 18 | A | 1.47 | A | 1.45 | A | 0.4 | B | 172 | A |
| 19 | 19 | A | 1.48 | A | 1.45 | A | 0.5 | A | 154 | A |
| 20 | 20 | A | 1.47 | B | 1.39 | A | 0.3 | A | 150 | B |
| 21 | 21 | A | 1.48 | A | 1.45 | A | 0.4 | B | 174 | A |
| 22 | 22 | A | 1.47 | A | 1.45 | A | 0.4 | A | 160 | A |
| 23 | 23 | A | 1.47 | B | 1.36 | A | 0.5 | A | 162 | A |
| C.E. 1 | C. 1 | A | 1.47 | D | 1.17 | D | 2.6 | A | 160 | B |
| C.E. 2 | C. 2 | A | 1.45 | C | 1.26 | B | 0.8 | C | 186 | C |
| C.E. 3 | C. 3 | A | 1.46 | A | 1.45 | A | 0.4 | D | 194 | A |
| C.E. 4 | C. 4 | A | 1.46 | B | 1.34 | A | 0.5 | C | 184 | A |
| C.E. 5 | C. 5 | A | 1.45 | D | 1.19 | A | 0.5 | A | 164 | A |
| C.E. 6 | C. 6 | A | 1.46 | D | 1.13 | A | 0.4 | D | 192 | A |
| C.E. 7 | C. 7 | A | 1.45 | D | 0.58 | A | 0.5 | A | 152 | D |

In the Tables,
"C.E." denotes "Comparative Example", and
"C." denotes "comparative".

Examples 2 to 23 and Comparative Examples 1 to 7

Evaluations were performed proceeding as in Example 1. The results of the evaluations are given in Table 5.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2020-045834, filed Mar. 16, 2020, which is hereby incorporated by reference herein in its entirety.

What is claimed is:

1. A toner, comprising:

a toner particle that comprises a core particle, said core particle comprising a binder resin;

a shell layer on a surface of the core particle, said shell layer comprising a thermoplastic resin; and organosilicon polymer particles on a surface of the toner particle, wherein the thermoplastic resin is a polymer of styrene and at least one member selected from the group consisting of acrylic polymerizable monomers and methacrylic polymerizable monomers, the thermoplastic resin has a peak top molecular weight of 30000 to 500000 measured by gel permeation chromatography, the organosilicon polymer particles have a number-average primary particle diameter of 10 to 500 nm, and an absolute value of a difference between SP values of the organosilicon polymer particles and the thermoplastic resin in the shell layer is not more than 2.30.

2. The toner according to claim 1, wherein a glass transition temperature of the thermoplastic resin is 40 to 75° C. measured by differential scanning calorimetry.

3. The toner according to claim 1, wherein the shell layer has an average thickness of 5 to 250 nm.

4. The toner according to claim 1, wherein a ratio of coverage of the core particle by the shell layer is at least 30%.

5. The toner according to claim 1, wherein a content of the organosilicon polymer particles in the toner is 0.3 to 10.0 mass %.

6. The toner according to claim 1, wherein the organosilicon polymer particles have a structure in which a silicon atom and an oxygen atom are bonded in alternation, and have a T3 unit structure represented by $R^1$—$SiO_{3/2}$ where $R^1$ represents a $C_{1-6}$ alkyl group or phenyl group, and a proportion of a peak area originating with silicon having the T3 unit structure to a total peak area originating with all silicon element contained in the organosilicon polymer particles is 0.50 to 1.00 in $^{29}$Si-NMR measurement.

7. The toner according to claim 1, wherein an attachment index for the organosilicon polymer particles on a polycarbonate film is not more than 4.5 determined by (area ratio A for the organosilicon polymer particles transferred to the polycarbonate film/ratio of coverage B by the organosilicon polymer particles over the toner particle surface)×100.

8. The toner according to claim 1, wherein a dispersity evaluation index for the organosilicon polymer particles on the toner surface is 0.5 to 2.0.

* * * * *